(12) United States Patent
Kayalar et al.

(10) Patent No.: US 12,242,922 B2
(45) Date of Patent: Mar. 4, 2025

(54) METHOD FOR TRACEABILITY OF RAW MATERIALS, COMPONENTS, OBJECTS, AND PRODUCTS EXPOSED TO HARSH OPERATIONAL CONDITIONS IN INDUSTRY

(71) Applicant: COSMODOT INC., Houston, TX (US)

(72) Inventors: Mete Kayalar, Istanbul (TR); Serra Demir, Istanbul (TR)

(73) Assignee: COSMODOT INC., Houston, TX (US)

( * ) Notice: Subject to any disclaimer, the term of this patent is extended or adjusted under 35 U.S.C. 154(b) by 378 days.

(21) Appl. No.: 17/704,013

(22) Filed: Mar. 25, 2022

(65) Prior Publication Data

US 2023/0306218 A1  Sep. 28, 2023

(51) Int. Cl.
*G06K 7/14* (2006.01)
*G06K 19/06* (2006.01)

(52) U.S. Cl.
CPC ......... *G06K 7/1473* (2013.01); *G06K 7/1417* (2013.01); *G06K 7/1443* (2013.01); *G06K 7/1482* (2013.01); *G06K 19/06037* (2013.01)

(58) Field of Classification Search
CPC ....... G06K 19/06037; G06K 19/06046; G06K 19/06075; G06K 7/1473; G06K 7/1417; G06K 7/1443; G06K 7/1482
See application file for complete search history.

(56) References Cited

U.S. PATENT DOCUMENTS

2018/0345323 A1* 12/2018 Kerver ............... G06K 7/10712
2022/0067468 A1*  3/2022 Smith .................. G06K 7/1434

* cited by examiner

*Primary Examiner* — Laura A Gudorf
(74) *Attorney, Agent, or Firm* — Bayramoglu Law Offices LLC

(57) ABSTRACT

A method for traceability of raw materials or objects exposed to operational conditions in industry, including coding phasea and decoding phase. The coding phase includes steps of uploading a design matrix file to a Cdot API, the Cdot matrix is a digital decomposition part of the coding phase, coding parameter inputs of the design matrix; generating a Cdot matrix by embedding a codeword using a Cdot matrix calculation algorithm. The decoding phase includes providing the Cdot matrix to a reader device; creating a Cdot matrix image from a raw image of a material or object or product having a Cdot matrix on a surface captured by a camera; decoding coded values in a code area of the Cdot matrix image to extract an assertive code; interpreting the assertive code to determine a unique object or material identification definition; providing the the object or material identification definition to a display.

18 Claims, 12 Drawing Sheets

METHOD FOR TRACEABILITY OF RAW MATERIALS, COMPONENTS, OBJECTS, AND PRODUCTS EXPOSED TO HARSH OPERATIONAL CONDITIONS IN INDUSTRY

TECHNICAL FIELD

The invention relates to raw material, component, object, or product identification and classification using encoded digital information applied to the to a surface of the raw material, component, object or product.

BACKGROUND OF THE INVENTION

The first industrial revolution introduced mechanization and steam power to the industry. The second industrial revolution introduced people with electric power and mass production. The third one was the industrial revolution, which enabled us to meet with electronics, information technology and automatic production. Today, the fourth industrial revolution or "Industry 4.0" is all about digitization and integration using the Internet of Things (IoT).

Nowadays, with the fourth industrial revolution, industrial product manufacturers are trying to move to the digital age level (smart factory, industry 4.0) where human—machine and other resources can work with each other in an interactive and collaborative model over complex networks. They are trying to create systems that can collect data from every stage of the processes through the "Internet of Things" (IoT) and monitor all raw materials, individual parts or assemblies as well as the complete product in a digital value creation chain with "Traceability". In every step of the operational processes (production, supply chain, sales, communication, etc.), digital data and processes become accessible, processable and reportable in a faster manner and without error. However, digitization of the most basic raw materials and parts of production is critical for 100% success of the traceability process (End-to-End Traceability).

The present invention is a pattern coding and decoding method that can digitize raw materials, components, objects, and products exposed to harsh operational conditions in real time, being resistant to uncontrollable or palpable conditions of a substance, the changes of the conditions, as well as to complex and multiple production steps and processes; where solutions such as a QR, datamatrix, etc. used in the current application for the digitization of raw materials, components and products that are exposed to harsh operational conditions are not sufficient.

The present invention provides highly resistant and successful digitization results in the following natural surface and structural properties of the raw materials, components, objects, and products.

These surfaces and materials are:
Inclined surfaces: Convex, Concave, Cylindrical, Saddle;
Materials with reflective surfaces: Glass Mirror, Glass, Metal, Polished Metal, Steel, Aluminum, Copper, Holograms, White Color reflective surfaces, Black Color reflective surfaces;
Transparent Materials: Clear Glass, Plexiglass, Colorless Plastic, Colored Plastic, Cellophane, Diamond, Lenses;
Rigid and Durable Materials: Polypropylene, PVC, Iron, Stone, Gold, Wood, Granite, Marble, Travertine, Brass, Steel, Copper; and
Textured Materials: Leather, Fabric, Brick, Formed Concrete, Rubber.

The present invention provides highly resistant and successful digitization results in the following industrial conditions and processes of the raw materials, components and products.

These industrial conditions and processes are:
Cracking, Shrinkage and Growth,
Heavy Metallized Coating (Bronze, Aluminum, Nickel, Chrome, Stainless steel, Zinc and Tungsten)
Powder and Pigment Coating, Industrial Heating and Firing processes, Enameling, Varnishing, Glazing Processes The present invention also provides highly resistant and successful digitization results with the following application techniques of the raw materials, components and products.

These application techniques are:
Laser Carving,
UV Printing,
Silkscreen Processing,
Rotary Printing,
Pigmented Repeat Printing Below are given some examples to give a better understanding of our invention:

For example, it is not possible to provide 100% traceability with applications such as QR and datamatrix etc. for components with complex shapes, inclined and reflective surfaces that form a vehicle, and components that operate in high temperature, humidity and vibration environments. The solutions such as labeling, and dyeing created for this purpose are not as successful as expected and cause additional costs. Similarly, QR and datamatrix applied to coatings having very different characteristics do not yield successful results. This is because that a surface application must be applied before sputtering, plasma diffusion and HIPIMS (high power impulse magnetron sputtering). However, in this case, the code applied on the surface is more or less covered, which prevents proper reading.

To give another example, especially in the production of durable consumer goods, QR and Data Matrix applied to metal surfaces such as iron, steel, aluminum that are fired cannot be properly applied to a surface that becomes glassy due to high temperature.

The invention can perform unique object or material identification and classification in an unlimited sector such as Automotive Industry and spare parts, Consumer Durables, White Goods and Brown Goods, Electrical and Electronic components, all kinds of displays, sensors, chips, Smart Factories (Industry 4.0), Aviation and Aerospace, Ship transportation, Dental and Medical components, Building materials, Machinery Manufacturing, Jewelry, Solar Energy systems and Photovoltaic production, and Textile products, and provides 100% Traceability, Sustainability and Interaction in digital processes.

Today, the readability of a Data Matrix is determined by how well a reader can decode the data stored in the symbol applied to the surface. The readability of the Data Matrix is affected by many technical and environmental factors. From the outside, although the Data Matrix applied to the surface seems to have no errors, it cannot perform reading due to the anomalies on the surface and operational difficulties.

Today, ISO/IEC 15415 Evaluation Parameters and AIM DPM Quality Manual have determined some measurement criteria in order for 2D bar codes to be measured by the manufacturers and to increase their quality.

The applications operations that are mainly covered by these guides are as follows:
Dot Matrix, Inkjet, Laser Marking and Electro-Chemical Marking. These guides includes the following measurement criteria and more. Users having non-ideal symbols associated with application operations or caused by inconsistencies in the substrates of the surface attempt to use these guides to correct and improve the markings and achieve a better symbol quality.

Measurement Criteria:
Axial Non-Uniformity, Angle of Distortion and Grid Non-Uniformity,
Symbol and Cell Contrast,
Wrong Reading Position,
Damage and Deterioration,
Modulation and Reflection Margin, Axial Non-Uniformity, Angle of Distortion and Grid Non-Uniformity:

Axial Non-Uniformity, as shown in FIGS. 1A and 1B, measures when the Y-axis dimension of the Data Matrix symbol is higher or less than the X-axis dimension. In other words, if the point where the Y and X axis meet is accepted as a sampling point, it is a measure of the difference from a comparison of the resulting spacing from one axis to another. An inconsistency in X and Y dimensions results in unreadable results.

Angle of Distortion, as shown in FIG. 1C, measures an angular deviation in the 90-degree axes between the horizontal row and vertical row of cells that make up the Data Matrix symbol. The acceptable value for readability is usually less than ±7 degrees.

Grid Non-Uniformity, As shown in FIG. 1D, refers to a Data Matrix symbol's cell deviation from the ideal lattice position. An increase in the degree of Grid Non-Uniformity indicates that the deviation is high with respect to the ideal lattice position, making it impossible to obtain a readability result.

If the surface of the material to be applied is curved or inclined, the symbol may have a high Axial Non-Uniformity, Angle of Distortion and Grid Non-Uniformity as a result of the applications that can be performed using Dot Matrix, Inkjet, Laser Marking and Electro-Chemical Marking. In an application where the surface of the material is Convex, Concave, Cylindrical and Saddle, angular deviations in the 90 degree axes between the horizontal row and vertical row of the cells forming the symbol and non-uniformity values in the corner cells of the symbol may increase. In cases where these values are high, the data in the symbol may not be analyzed and the data matrix cannot be read. Meanwhile, it is possible to have an unreadability result due to Grid Non-Uniformity in those parts that are difficult to apply, indented and with different sized sections.

As shown in FIGS. 2A-2C, Axial Non-Uniformity, Angle of Distortion, and Grid Non-Uniformity may generally be caused by incorrect printing result or marking speed. Although both causes can be corrected, they can also be an indispensable result of a special production process. Although the surface of the material to be applied is not a curved surface but a flat one at the first stage, if it is given a form that can expand and contract in the second stage, the data in the symbol might not be analyzed. When the symbol is printed flat at the first stage, and then at the second stage, where the protective packaging of any object, beverage and food products sold in the markets, and valuable products produced in a special series is transformed into a plastic film enclosing the products in a tightly shrinking way to pack the materials, as in FIG. 2C, a change in dimensions may cause the symbol's Y-axis dimension to be greater or less than the X-axis dimension, or vice versa. Excess axial non-uniformity values cause the data in the symbol not to be analyzed and read.

Symbol and Cell Contrast

To extract data from a Data Matrix symbol, a reader must be able to distinguish between light and dark elements of the symbol. Both element types, light and dark, are required for proper decoding. Symbol Contrast measures a difference between the light and dark elements of the symbol, and between the Quiet Zone and the outer boundary elements, which is a measure of the overall contrast between the brightest module and the darkest module. Cell Contrast measures a difference between the averages of the symbol's brightest and darkest values and ranks them by level.

Both parameters can be considered in Inkjet, Laser Marking and Electro-Chemical Marking methods. Also, depending on what type of material is used, light or dark elements alternately seat either on a surface (the code itself) or on a substrate on which the marks are applied. If there is not enough contrast between the two elements, a barcode reader may not be able to distinguish the barcode from the substrate, resulting in unreadability.

FIGS. 3A-3C show typical surfaces that can cause low contrast. Such surfaces include light colored materials and surfaces, reflective materials and surfaces, and/or transparent materials and surfaces. Symbols marked on light colored, specular and reflective materials and surfaces such as Glass Mirror, Glass, Plastic, Plexiglass, Metal, Steel, Aluminum, Copper, Gold, Bronze, Holograms, White Color reflective surfaces, Black Color reflective surfaces, some metallic coated surfaces may cause reading error due to low contrast between the light and dark.

Alternative Methods Applied if Low Contrast Cannot be Avoided and the Problems They Create.

Manufacturers can use many different solutions to achieve the appropriate contrast. The most widely known fact for the solutions is the idea that high-quality reader device hardware would provide solutions. For this reason, manufacturers can be directed to quality and high cost readers, establish code quality verification solution systems, and also prefer to install additional light equipment that can solve the low contrast problem, and try to choose more specialized printing or laser marking machines performing the application. Manufacturers, dealing with raw materials and parts that will cause low contrast, spend a lot of time and effort trying to achieve an acceptable level of reading success. Choosing the right devices, running tests, and performing pilot studies take time and effort, which can be laborious steps. If the trials on surfaces that may cause low contrast have not yielded the desired successful reading values despite the devices used, the manufacturer may abandon the application methods tried and try to adhere a label on the raw material, part or product. Since the label interrupts a contact of the data matrix symbol with the material on flat surfaces, it makes it more convenient to meet the substrate contrast level. Although the manufacturer achieves successful results in reading the symbol, there are various problems with the compatibility and processes of the label. The labeled raw materials, parts, and products have durability problems regarding their compatibility with the surface material, temperature changes, pressure changes, and liquid contact. The label may be rubbed off surfaces. If the surface is uneven and inclined and curved, applying the label, wrapping the label, etc. may further increase the risk of subsequent rub off of the label. Also, data matrix reading may not take place on a label that has been rotatably wrapped around thin pieces. Label applications also cause costs such as labeling machines and consumables. For example, since a thin engine cooling pipe made of polypropylene material fails in reading tests with data matrix application methods, which are preferred due to both its small and curved surface and low contrast values, generally labeling is preferred. These types of parts, shipped to another country as a result of exportation, cause part identification problems for the part due to the separation of the labels from the part in hot climates. Similarly, while an automobile brake disc with a zinc-plated, specular and rough surface is being transported with a label attached thereto at the end of production, or when it loses its label during its life cycle on the vehicle, product identification problems are experienced.

Wrong Reading Position

In some cases, a readable symbol may not be readable due to the physical location of the reader relative to the symbol, but not the quality of the print or marking. The focal distances of most readers vary depending on the optics contained therein. These optics determine how close or how far a reader can be positioned from a symbol to ensure successful reading, within a range from the closest possible reading distance to the furthest reading distance.

Even if a reader is disposed in the correct position, an angle at which it scans or captures a symbol may also affect reading performance. Having the barcode reader positioned at a right angle, or at a horizontal angle, at all times, does not guarantee a successful reading result. If the reader is positioned perpendicular to the symbol, it may cause reflection. The laser light from the barcode device may return to the device, or another device illuminating the symbol or the substrate may interfere with the reader, making it invisible to the reader. In both cases, the required contrast cannot be achieved and the symbol may not be read. In common use, readers are mounted at a horizontal angle to avoid the possibility of low contrast that may arise from positioning at a vertical angle.

Production involves raw materials and parts with variable reading angles and special assembly requirements. Structural and morphological features of the production line and its cells, the light used in the production line, the variability of the cells based on their distances can cause various space constraints and geometrical difficulties. In such cases, it may be difficult or even impossible to assemble the readers in such a way that the symbols on the raw materials and parts can be read successfully, and to provide all the necessary conditions to eliminate light reflection, light bounce, and barcode blinding.

Today, manufacturers endeavor to find a more suitable reader to accommodate unpredictable barcode distances, angles and orientations if application requirements are challenging. This can be difficult and costly. A reader device provided as a solution to a problem may not be a solution to another problem in the same production area, which causes the process to become more challenging and require research time.

FIGS. 4A and 4B show data matrices that are affected by damage or deterioration. Especially when the main elements of a data matrix are considered, the fixed L-pattern forming the outermost left and outermost bottom rows of the symbol, the fixed Clock-pattern forming the border region opposite them, and the middle zone data storage area enable the reader to understand the direction of the symbol, to interpret the number of rows and columns and understand the data storage region. It is necessary for the reader to obtain a result that these regions are not damaged or harmed.

In parts and finished products that can be used continuously and repeatedly, the physical state of the barcode exposed to environmental factors may change as the uses continue to increase throughout the use of parts, spare parts and finished products with the secondhand market.

In production, the physical state of the barcode may change as the raw materials are exposed to external factors, as the parts move through the steps. Wear, damage, and deterioration can occur not only on the barcode itself, but also on the substrate. While any damage to a symbol on the labels occurs as a result of scratches, stains, folding, bending, and tearing, scratches on a symbol on the laser marked surface may occur as a result of dust entering the symbol cell, paint on the symbol, stains, abrasion due to friction, undesired material abrasion, cracking or breaking on the substrate, and part breakage. Damage to the data matrix processed by inkjet may occur as a result of scratching the ink, condensation due to temperature changes, wiping the ink with chemicals for cleaning and maintenance and dispersion of the ink, abrasion due to friction, cracking on the substrate. Error correction codes in the reader may not be sufficient for the damaged data matrix symbol to be read.

Reducing damage and deterioration can be costly for the manufacturer. When a data matrix is introduced into a production environment, it can be difficult to maintain consistent matrix quality. To do this, the manufacturer can add preliminary steps to the production processes, choose a more costly substrate that is more resistant to harsh environmental conditions, and apply a protective coating on the data matrix.

FIG. 5A shows a data matrix exhibiting contrast modulation. The contrast levels within a data matrix may differ from each other. Some cells within the symbol may have high contrast, while some regions within the same symbol may have low contrast. The consistency of the contrast levels in the symbol is the modulation parameter. Low modulation is one of the most common reasons that makes the data matrix difficult to read. The modulation problem can be caused by possible problems at the time of application, such as the ink applied during code printing not being uniformly distributed, condensed in certain regions or diluted in certain regions. Also, the modulation problem may directly arise from uneven wear rates and degrees of scraping in the marking of the parts.

Achieving modulation can be costly for the manufacturer. The manufacturer may have to use costly devices for marking parts that perform consistent marking in terms of wear rates and scraping degrees. Conditions become more difficult if the substrate is a difficult surface due to the material of the part and product to which the data matrix will be applied. Substrate surface properties may be such that wear is inconsistent. In this case, more expensive marking devices that are sensitive and have high application quality can be preferred. If the code is to be applied by printing, the quality of the inkjet device and the quality of the ink used may also increase, thereby increasing costs.

Reflection Margin is a parameter that measures whether each element in the symbol can be clearly and well understood, whether light or dark. A low reflectance margin indicates an increased likelihood of incorrect identification of the dark or light elements in the symbol. This is caused by the fact that the substrate is generally textured, rough and ragged, and the substrate has a structure consisting of different components and crystals.

FIG. 5B shows surfaces which may result in the need for contrast modulation of the data matrix. Rigid, Durable and Textured Materials and Surfaces; Symbols marked on rigid and durable materials and surfaces such as Iron, Steel, Copper, Brass, Gold, Granite, Marble, Travertine, Leather, Fabric, Stone, Brick, Formed Concrete, Wood, Polypropylene, PVC, Rubber, may not be clearly understood as light or dark elements since the substrate is textured, rough, ragged, and matte, and the substrate has a mixed surface structure consisting of different components and crystals.

Production Processes with the Hardest Reading Conditions:
Metallized Coating

In production, some raw materials, parts and products need various coating steps to be more durable, more aesthetic and resistant to corrosion. When coatings, raw materials, parts and products, using Zinc, Nickel, Iron, Chrome, Copper, Manganese, Bronze, Aluminum, Steel, and Tungsten alloys, such as Alkaline Zinc Plating, Alkaline Zinc Nickel Alloy Plating, Alkaline Zinc Iron Alloy Plating, Acid Zinc Plating, Decorative Bright Nickel and Chrome Plating, Decorative Matte Nickel (Satin) Plating, Copper Plating, Manganese and Zinc Phosphate Coating and Black Oxidation (tarnishing) commonly used in the industry, are subjected to ink printing or laser marking processes in the first step to generate data thereon, even if they get a reading result achieving the success values, they will achieve inconsistent reading results, or unreadability result, when the coating, which also has to be applied to the entire surface, is applied on the data matrix at the final stage. In trials made by changing the steps, the material can be coated and then can be subjected to ink printing and laser marking processes for creating data thereon. However, ink printing is generally not successful after this process. The QR or datamatrix symbol transferred by laser marking method removes the coating layer, rendering the product being prone to corrosion over time. This data creation process, which is obtained by changing the steps, can also create inconsistent reading results or unreadability result. As a result, it becomes problematic in terms of quality and traceability of the part and product.

Electrostatic Powder Coating

The process called ESD (Electrostatic Spray Deposition) is typically a process of applying a powder (mixture) coating on a metal substrate. This application method is the process of spraying the powder particles on the metal surface with a spray gun that applies an electrostatic charge and then drying it at approximately 200° C.

In production, some raw materials, parts and products need powder coating to be more durable, more aesthetic and resistant to corrosion. When the raw materials, parts and products to be dyed are subjected to ink printing or laser marking at the first step in order to generate data thereon, even if they obtain a reading result that meets the success values, they will achieve inconsistent reading results, or unreadability result, when the dyeing, which also has to be applied to the entire surface, is applied on the data matrix at the final stage. In trials performed by changing the steps, they can be subjected to ink printing and laser marking processes for dyeing the material and then creating data thereon. In this case, too, the ink printing may not achieve sufficient contrast in the symbol on the substrate, and the ink may often not adhere to the surface at all. Laser marking, on the other hand, removes the powder-dyed layer and reveals cracks on the side edges and surfaces of the product, which coincide with the symbol, thereby causing corrosion starting from the symbol area over time.

This data creation process, which is obtained by changing the steps, also creates inconsistent reading results or unreadability result. As a result, it becomes problematic in terms of quality and traceability of the part and product.

Wet Paint Coating

The process involves wet blasting a liquid paint over the metal substrate. Wet paint is more conventional way of coating to apply fluid paint onto a metal item for a colorful wrap up. Usually, a pressurized vessel is utilized to spread the wet paint equally on the metal surface. The fluid paint may contain chemicals for a more tightly, firmer coat. When the raw materials, parts and products to be dyed are subjected to ink printing or laser marking at the first step in order to generate data thereon, even if they obtain a reading result that meets the success values, they will achieve inconsistent reading results, or unreadability result, when the pain, which also has to be applied to the entire surface, is applied on the data matrix at the final stage. In short, the data matrix will be covered with wet paint coating and there will be no reading result. In trials performed by changing the steps, they can be subjected to ink printing and laser marking processes for painting the material and then creating data thereon. In this case, too, the ink printing may not achieve sufficient contrast in the symbol on the substrate, and the ink may often not adhere to the surface at all. Laser marking, on the other hand, removes the wet paint coated layer and reveals cracks on the side edges and surfaces of the product, which coincide with the symbol, thereby causing corrosion starting from the symbol area over time. This data creation process, which is obtained by changing the steps, also creates inconsistent reading results or unreadability result. As a result, it becomes problematic in terms of quality and traceability of the part and product.

Enameling

Enamel, which is a form of coating obtained from baking metal surfaces such as steel, iron, aluminum with silicate-based mixtures at 800-900° C., is one of the most important processes in the production of white goods, kitchenware and stoves. Measurement of the thickness of coating is important in this process. When the raw materials, parts and products to be coated are subjected to dot peen or laser marking at the first step in order to generate data thereon, the applications made in the pre-coating stage cause inconsistent reading results or unreadability result after coating and firing.

Glazing Operations

In the ceramic industry, parts and products are subjected to a glazing process, which is the direct glass transition of the ceramic at high temperature, in order to be more durable, more colorful and aesthetic, and to gain waterproof properties. When the parts and products to be glazed are subjected to laser marking at the first step in order to generate data thereon, inconsistent reading results or unreadability result may be obtained after the application made in the pre-glazing stage. While the laser marking made after glazing is not preferred in accordance with the quality standards, the substrate generally cannot adhere on the ink surface due to the resulting slippery surface thereof, with the ink printing application after the glazing.

To give a few examples for all the difficulties and deadlocks mentioned above in the invention of this description:

When a marking such as QR or Datamatrix applied with laser marking is made on a metal sheet and then there is a deterioration on the surface due to oxidation, in case of deterioration or disappearance at any point of the transferred QR or Datamatrix, all readers will no longer be able to perform reading.

In another example, marking is made on small parts especially in the industrial and automotive fields with a minimum area of 8 square millimeters, and the marking is destroyed sometimes due to the small size of the product and sometimes due to the temperature differences that the product has undergone.

In summary, in the raw materials, components and materials that are exposed to difficult and complex industrial processes in the industrial production world, including Metallized Coating, Electrostatic Powder Painting, Wet Paint Coating, Enamel, Glazing Processes, Production Processes with Difficult Reading Conditions, QR and datamatrix options cannot work and so far do not provide solutions, due to Axial Non-Uniformity, Angle of Distortion and Grid Non-Uniformity, Symbol and Cell Contrast, Wrong Reading Position, Damage and Distortion, Modulation and Reflection Margin problems, Alternative Methods Applied if Low Contrast Cannot be Avoided and the Problems They Create, Surfaces That May Cause Low Reflection Margin, explained in detail above.

In the invention of this description, there is studied on a method that enables the traceability of the raw materials, components and materials that are exposed to difficult and complex industrial processes in the industrial production world, being the Production Processes with The Hardest Reading Conditions namely Axial Non-Uniformity, Angle of Distortion and Grid Non-Uniformity, Symbol and Cell Contrast, Wrong Reading Position, Damage and Distortion, Modulation and Reflection Margin problems, Alternative Methods Applied if Low Contrast Cannot be Avoided and the Problems They Create, Surfaces That May Cause Low Reflection Margin; including Metallized Coating, Electrostatic Powder Painting, Wet Paint Coating, Enamel, Glazing Processes.

In the invention of this description, a durable Special Matrix is produced for unique identification of all processes and materials, the reasons and details of which are explained above, and 100% solution is provided with coding and decoding method, as can be seen in the detailed explanations below, developed to ensure traceability.

The metals on which provided with coding processes are carried out with the method of the invention are aluminum, steel, zinc, lead, copper, platinum, diamond, gold, palladium, bronze, tin, tungsten, rhodium, brass, titanium, cobalt, glass, ceramic, rubber, plastic (polyethylene etc.), stone, marble, granite, travertine, basalt and andesite, wood, cement, aggregates, brick, clay, concrete, PVC, and at least one such material and for each different product type.

During the coding phase, one of the steps of the method of the invention, the unique martrix is formed by the combination of a great number of cells. The unique matrix is a special sequencing and is implemented with the inventive step and technique. The unique matrix contains a mathematical algorithm consisting of at least one cell, each having unique array and obtained by the Assigning Value to the Data Cells and Acceleration Measurement and Modeling management.

As a result, due to the above-mentioned disadvantages and the inadequacy of the existing solutions on this subject, it was necessary to make an improvement in the relevant technical field.

BRIEF SUMMARY OF THE INVENTION

The invention is inspired by current situations and aims to solve the above-mentioned disadvantages.

The object of the present invention is to provide a system for permanent identification of raw materials, components and materials that are exposed to difficult and complex industrial processes in the industrial production world, being the Production Processes with The Hardest Reading Conditions namely Axial Non-Uniformity, Angle of Distortion and Grid Non-Uniformity, Symbol and Cell Contrast, Wrong Reading Position, Damage and Distortion, Modulation and Reflection Margin problems, Alternative Methods Applied if Low Contrast Cannot be Avoided and the Problems They Create, Surfaces That May Cause Low Reflection Margin; including Metallized Coating, Electrostatic Powder Painting, Wet Paint Coating, Enamel, Glazing Processes, and external factors that it experience or will experience with the data network, wherein we mean with the external factors to identify a part of the raw material, component and product that is resistant to the conditions and processes experienced and especially traceability throughout the entire life of the material, without using any electronic components, against the difficult and never applicable conditions, which will be expressed with all the steps below; coding on the raw material, object, component, and/or product with this distinguishing identification without losing the reality structure thereof, to ensure connectivity to guarantee reaching to computerized network, provide a direct relationship between system modeling and the user, whether the link between industry 4.0 and traceability or the end user product, without creating a direct and central management system.

Another object of the present invention is to provide a system that provides real-time coding and decoding and interpreting of data sets processed on the raw materials, components, and products.

In the system of the invention, the transmitted unique Cdot Matrix information is interpreted and processed. As a result, the inputs that can be produced, managed, produced in the system and directed to other systems software are transferred to the platforms to be accessed in accordance with all requirements.

The structural and characteristic features of the invention and the advantages thereof will be understood more clearly from the drawings given below and the detailed description with reference to the drawings, and thus the evaluation should be made by taking these drawings and detailed explanation into account.

The invention provides a method for traceability of raw materials or objects exposed to operational conditions in industry, the method having a coding phase having steps of uploading a design matrix file to a Cdot API, the Cdot matrix is a digital decomposition part of the coding phase; classification of the coordinate area size of the design matrix; coding parameter inputs of the design matrix; generating a Cdot matrix by embedding a codeword into the design matrix using a Cdot matrix calculation algorithm; mapping bit color of the Cdot matrix; providing the Cdot matrix to a display buffer; and a decoding phase having steps of providing the Cdot matrix from the display buffer to a camera buffer of a reader device; creating a Cdot matrix image from a raw image of a material or object or product having a Cdot matrix on a surface captured by a camera of the reader device; partitioning or dividing different layers of the Cdot matrix image into color cells; detection of progressive code locator and determination of location in the Cdot matrix image; decoding coded values in a code area of the Cdot matrix image to extract an assertive code; detecting and correcting errors in the assertive code; interpreting the assertive code to determine a unique object or material identification definition; synchronizing the unique object or material identification definition with a tracking ID value in a core system; providing the the object or material identification definition to the reader device and displaying the identification definition on a display of the reader device.

In a preferred embodiment, the step of generating the Cdot matrix includes placing an alignment symbol to the top left section of the Cdot matrix, calculating Reed-Solomon Error Correction bits, selecting a mask and placing mask information around the alignment symbol.

In a preferred embodiment, the step of mapping bit color of the Cdot matrix includes shape, size, color, shadow, and relationships of the design matrix.

In a preferred embodiment, the step of creating the Cdot matrix image from the raw image includes filtering, graying, thresholding, and morphological preprocessing.

In a preferred embodiment, the step of detection of progressive code locator and determination of location includes steps of frame synchronization, corner tracer detection, correcting perspective distortion, correcting motion and focus blur, color manipulation, and/or reducing noise from vibration and shaking of the camera of the reader device.

In a preferred embodiment, the step of decoding coded values in a code area of the Cdot matrix image to extract the assertive code comprises generating code locators in middle and right columns and columnizing dots.

In a preferred embodiment, the step of detecting and correcting errors in the assertive code includes forward error detection including steps of syndrome calculation, Berlekamp Massey Algorithm for finding the error-locator polynomial, Chien Search Algorithm for finding the roots of the error-locator polynomial, and Forney algorithm calculation of error size.

In a preferred embodiment, the step of interpreting the assertive code to determine a unique object or material identification definition includes synchronizing the assertive code with a Hex value and recording the assertive code in a database.

In a preferred embodiment the step of synchronizing the unique object or material identification definition with a tracking ID value in a core system includes associating the tracking ID with a counterpart in the database.

In a preferred embodiment the Cdot matrix is provided on the surface of a raw material or object without disturbing the raw material or object quality or structure.

In a preferred embodiment the Cdot matrix calculation algorithm comprises a coding with a specially developed mathematical algorithm using the gaussian mixture model.

In an embodiment of the invention a system for providing traceabilty to raw materials or objects exposed to operational conditions in industry is provided having a coding module in a software API, the coding module that includes a design entry module configured to receive a unique Cdot matrix file via a communication channel, a coordinate area size and material classification module configured identify and classify the unique Cdot matrix file, a coding parameter input module configured to populate an information database using cell bits obtained by design preprocessing, material classification and feature extraction and the field data calculated as pixels of the unique Cdot matrix file, a Cdot matrix generation module configured to embed a codeword into the Cdot matrix generating a unique Cdot matrix, and a bit color mapping and formation module configured to map attributes of the unique Cdot matrix, where the coding module provides the unique Cdot matrix to a a printing device; and a printing device including a memory configured to receive the unique Cdot matrix from the coding module, and a printing module to print the unique Cdot matrix on a raw material or object exposed to operational conditions in industry.

In a preferred embodiment, the Cdot matrix generation module is configured to embed the codeword into the Cdot matrix comprises calculating Reed-Solomon Error Correction bits, selecting a mask, and placing mask information around the alignment symbol.

In a preferred embodiment, the bit color mapping and formation module is configured to map attributes including shape, size, color, shadow, and relationships.

In an embodiment of the invention a system for reading and decoding a Cdot matrix applied to raw materials or objects exposed to operational conditions in industry is provided having a reading device having a camera, a camera buffer, and a display, wherein the camera is configured to a capture an image of a raw material or object having a Cdot matrix applied and storing the image the camera buffer; and a decoding module, the decoding including an image preprocessing module configured to reduce noise and remove unnecessary details of the captured image to generate a Cdot matrix image, a partitioning or dividing module configured to partition or divide different layers of the Cdot matrix image into color cells, a code locator module configured to determine the location of the Cdot image, a decoding module configured to decode coded values in a code area of the Cdot matrix to extract an assertive code, an assertive code interpreting module configured to determine a unique object or material identification definition, and a sychronization module configured to associate the unique object or material identification definition with a tracking ID value in a core system, the decoding module provides the object or material identification definition to the reader device and the reader device displays the identification definition on the display of the reader device.

In a preferred embodiment, the image preprocessor module is configured to create the Cdot matrix image from the raw image by applying filtering, graying, thresholding, and morphological preprocessing.

In a preferred embodiment, the code locator module is configured to perform frame synchronization, corner tracer detection, correcting perspective distortion, correcting motion and focus blur, color manipulation, and/or reducing noise from vibration and shaking of the camera of the reader device.

In a preferred embodiment, the decoding module is configured to generating code locators in middle and right columns and columnizing dots when extracting the assertive code.

BRIEF DESCRIPTION OF THE DRAWINGS

FIG. 12 is a schematic representation of the usage flow architecture of the system of the present invention.

DETAILED DESCRIPTION OF THE INVENTION

Figure 1A:
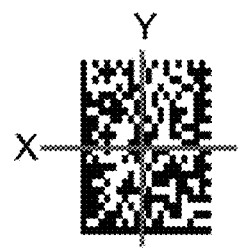
FIG. 1A-1D show data matrix symbols having axial non-uniformity, angle distortion, and grid non-uniformity.
Figure 1B:
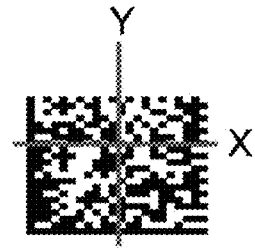
Figure 1C:
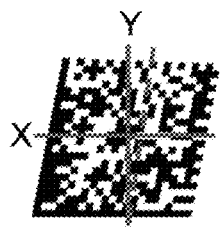
Figure 1D:
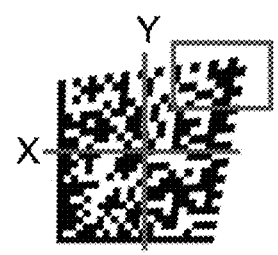
Figure 2A:
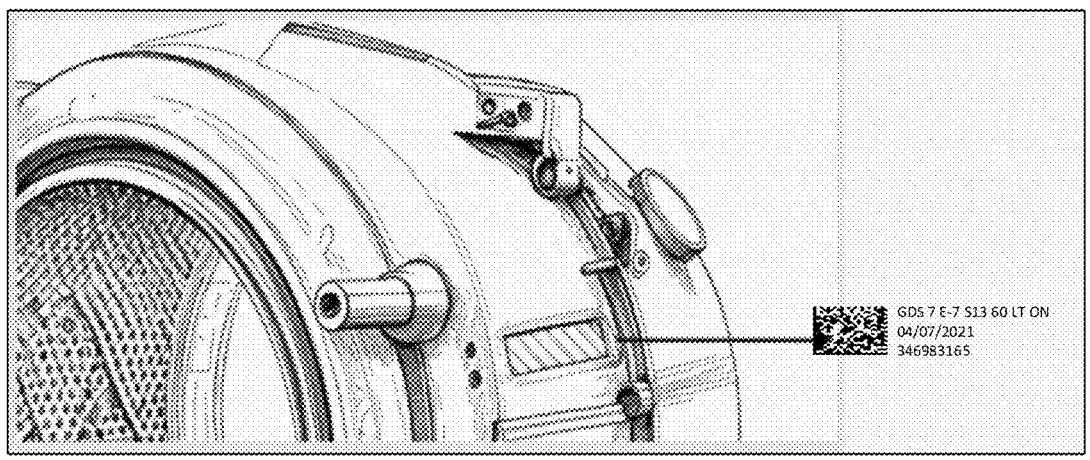
FIG. 2A-2C show data matrix symbols in situ exhibiting axial non-uniformity, angle distortion, and grid non-uniformity.
Figure 2B:
Figure 2C:
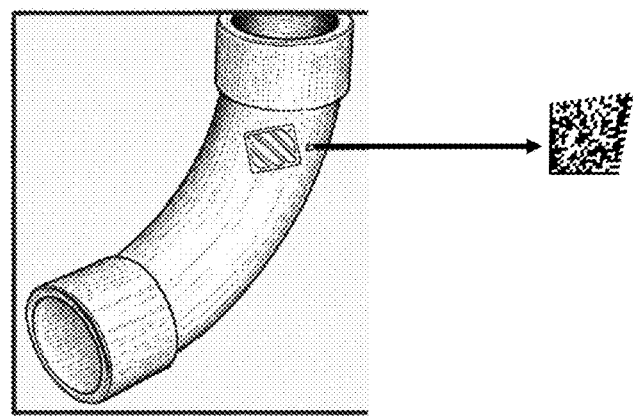
Figure 3A:
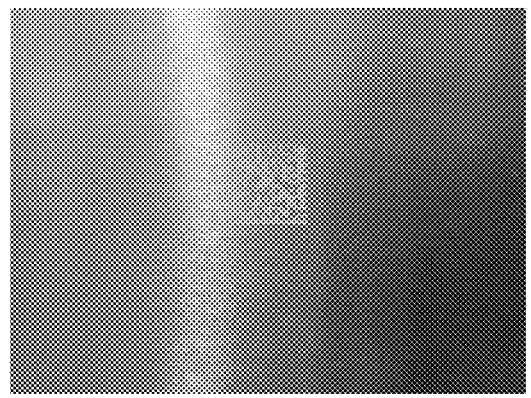
FIG. 3A-3C show surfaces that cause low contrast of the data matrix symbol due to, e.g., material color, reflectiveness, or transparency.
Figure 3B:
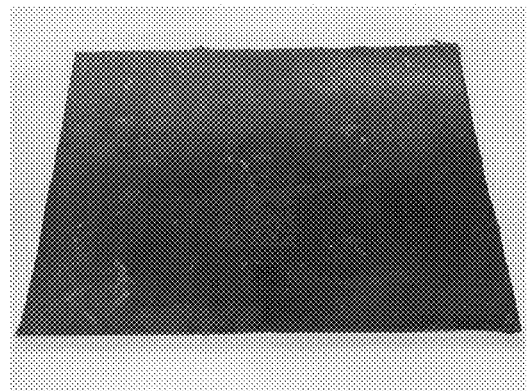
Figure 3C:
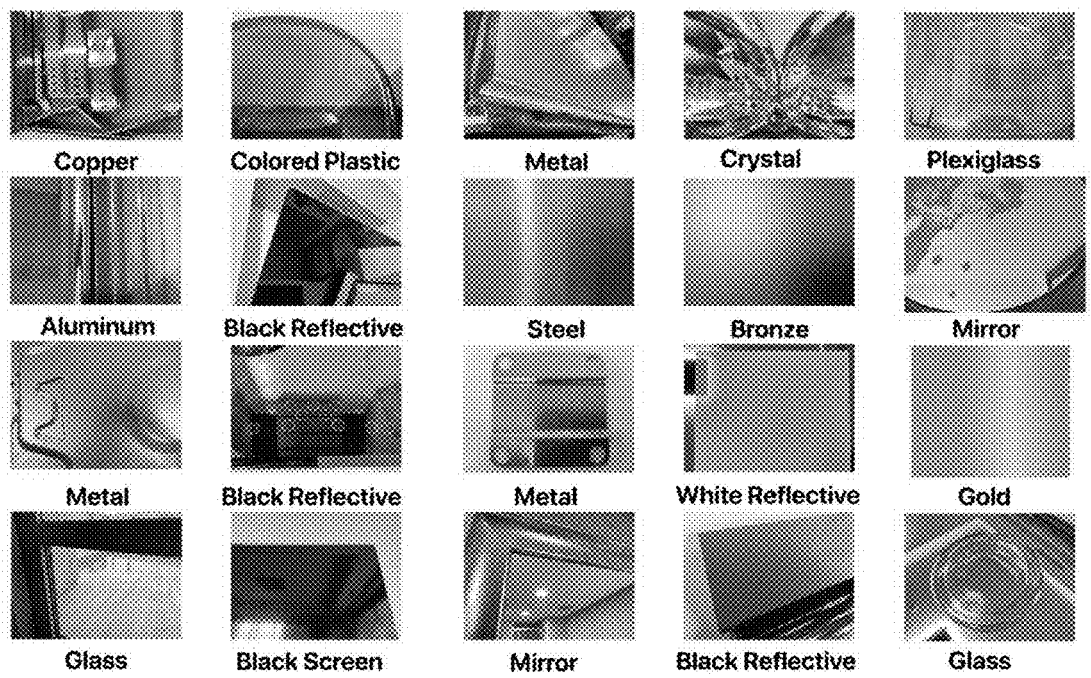
Figure 4A:
FIG. 4A-4B show data matrix symbols with damage or deterioration.
Figure 4B:
Figure 5A:
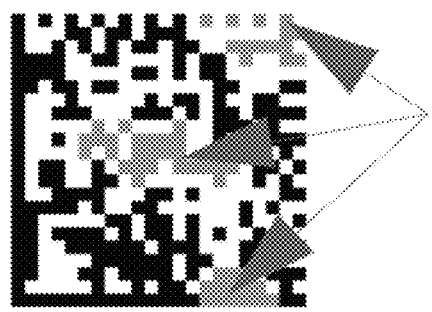
FIG. 5A-5B show a data matrix symbol on a surface with low reflectance margin and examples of surfaces that can cause low reflectance margin.
Figure 5B:
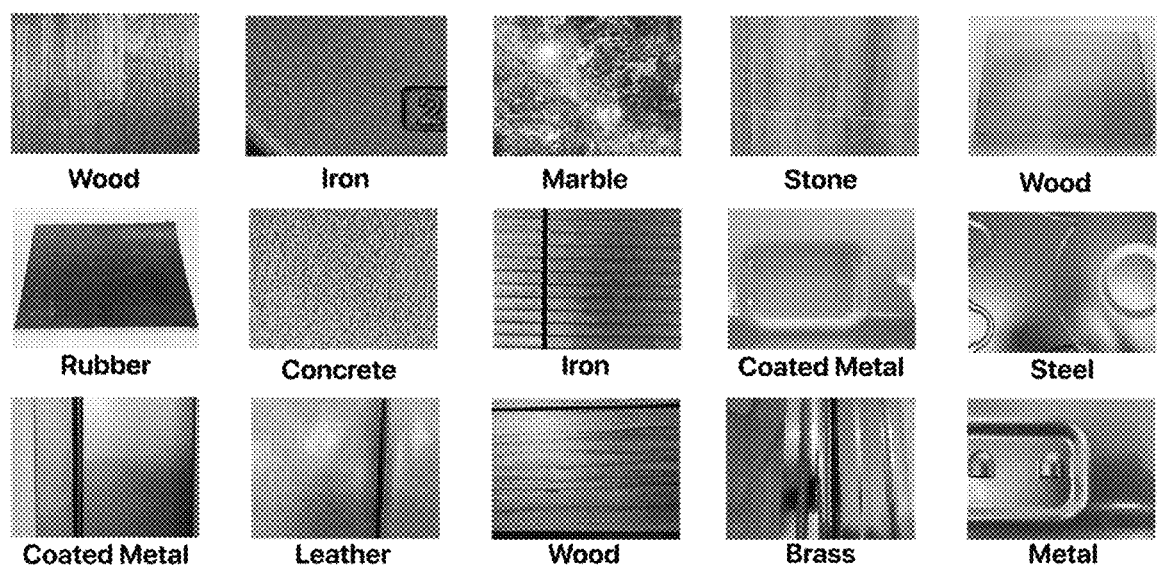

In the detailed description, preferred embodiments of the system of the invention are explained for a better understanding of the subject.

The invention uses Coding with a specially developed mathematical algorithm employing a gaussian mixture model for the coding and decoding algorithm. The Coding with a specially developed mathematical algorithm using the gaussian mixture model coding and decoding algorithm is resistant to distortions caused by real production and external conditions and that provides coding and decoding of arbitrary bridge multi-bit sequences over raw materials, components and products in a way that provides a solution to the problems and variations in traceability, sustainability, interaction, size, resistance to external conditions (dust, hot cold temperature differences), lighting, shadows, perspective, closure and tracking distance, thanks to the Unique Cdot Matrix placed on the materials and is independent of the design and size, which works in harmony with the file formats of the machines that perform the Unique Cdot Matrix process placed on the raw materials, components and materials that are exposed to difficult and complex industrial processes, being the Production Processes with The Hardest Reading Conditions namely Axial Non-Uniformity, Angle of Distortion and Grid Non-Uniformity, Symbol and Cell Contrast, Wrong Reading Position, Damage and Distortion, Modulation and Reflection Margin problems, Alternative Methods Applied if Low Contrast Cannot be Avoided and the Problems They Create, Surfaces That May Cause Low Reflection Margin; including Metallized Coating, Electrostatic Powder Painting, Wet Paint Coating, Enamel, Glazing Processes via using Laser Carving, UV Printing, Silk Screen Processing, Rotary Printing, Pigmented Repeat Printing.

In the invention, unique object or material identification and classification of the raw materials, components and products in real time, and results thereof are provided. As it will be stated in the detailed description of the invention, in the realization of the experimental studies of the method within the scope of this specification, despite the material and condition differences, successful results of the system are proven from the identification of the furnace body samples and then the successful reading result after the enameling process, the identification of the vehicle brake parts by laser carving before the zinc coating and the successful reading result after the zinc coating, the identification of the pitch-black fabric by pigmented repeat printing and successful reading result, the identification of automobile cooling pipe samples made of polypropylene material with laser carving and successful reading result after exposure to 200 degrees heat when mounted on the vehicle, the identification of all surfaces of rubber vehicle tire samples with laser carving and successful reading result after driving miles tests.

After the images of the coded raw materials, components and products in the working environment are captured with a camera, they are processed using of decoding, Reed-Solomon and robust techniques. The size and area data of the cells that the objects occupy on the encoded image plane are calculated. By evaluating the data obtained, f is divided into three classes in real time, i.e. small cell clusters (C1), medium cell clusters (C2) and large cell clusters (C3). This is carried out using mean-based classification and Cdot clustering methods, whose detailed explanations are given below. The data obtained from the determination of the cluster centers and the classification process are stored and processed by using the information database.

All test values and samples in the working environment have been concluded with 100% success by using the techniques of our invention. After the sequences of the Unique Cdot Matrix cluster were coded, the coded Unique Cdot Matrix was processed on the real product and classified and identified using mean-based and Cdot clustering methods. As a result of a comparison, there are explained the direct interaction between the raw material, component and product that has not been processed and the digital world of the raw materials, components and products coded with the Unique Cdot Matrix simulated without using an electronic component, and the invention proof steps for unique object or material identification solution that maintains the endurance as long as the lifetime of the durable product despite all external conditions.

Figure 6:
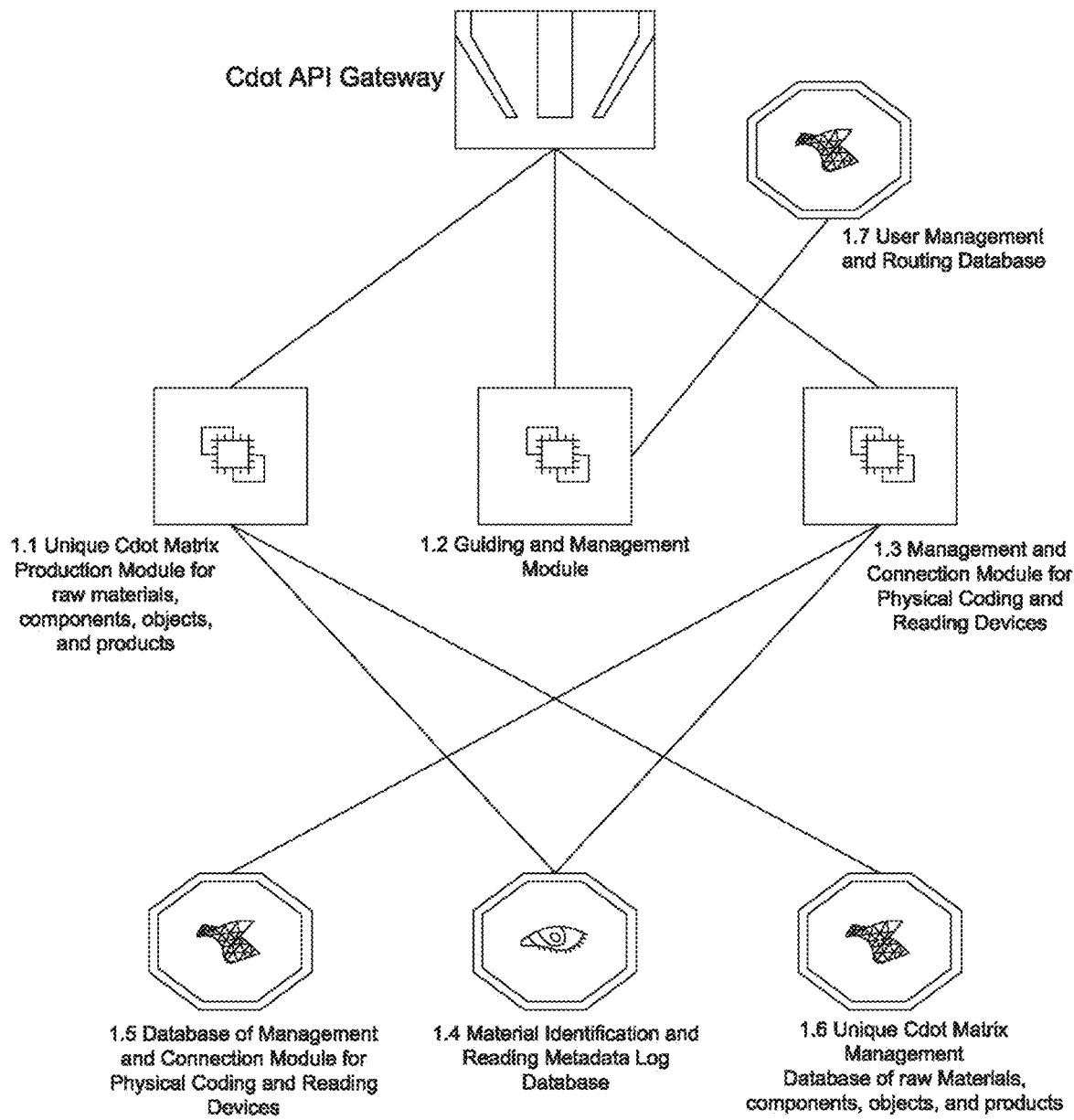
FIG. 6 is a schematic representation of the system architecture of the present invention.

FIG. 6 is a schematic representation of the system architecture of the invention. The references in the schematic representation are: 1.1 Unique Cdot Matrix Production Module for raw materials, components, objects, and product. 1.2 Guiding and Management Module. 1.3 Management and Connection Module for Physical Coding and Reading Devices. 1.4 Unique Object or Material Identification and Classification Metadata Log Database. 1.5 Database of Management and Connection Module for Physical Coding and Reading Devices. 1.6 Unique Cdot Matrix Management Database of raw materials, components, objects and products. 1.7 User Management and Routing Database.

Figure 7:
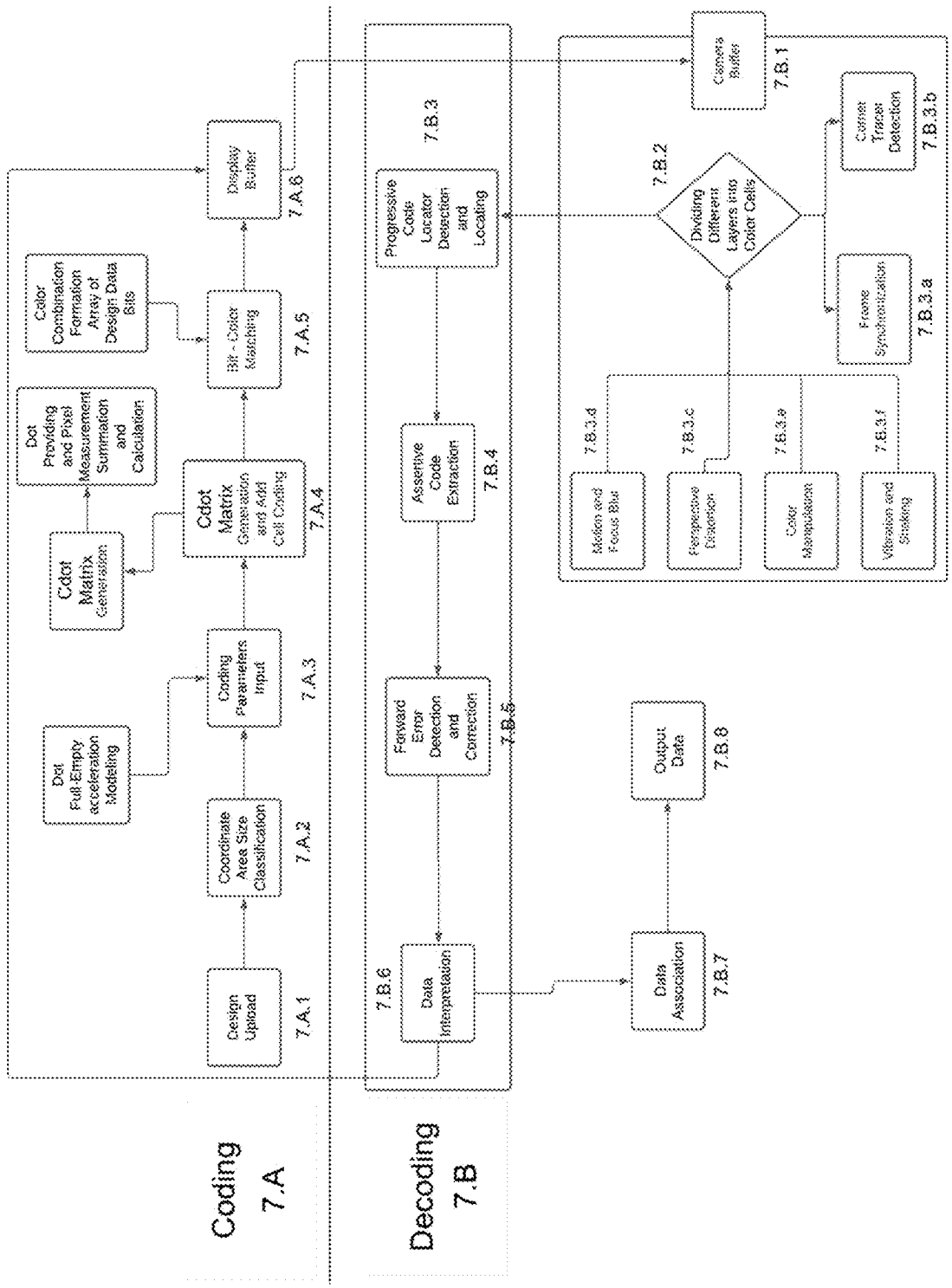
FIG. 7 is a schematic representation flow diagram of the coding and decoding architecture of the present invention.

FIG. 7 is a schematic representation flow diagram of the coding and decoding architecture of the system of the invention. Description of References in FIG. 7 are as follows:

7.A—Coding

7.A.1. Design Uploading

Design Entry Module

In this step, the visual design to be coded on the surface of the raw materials, components and products, any shape, symbol, etc. The visual design can be a company logo, regular or irregular polygons or geometric shapes (triangle, rectangle, hexagon, star, circle, oval, ellipse, etc.), or other similar visual design that is easily recognized visually by a user. The user may have a digital design, or a library of standard visual designs may be provided in a library. This design is the digital decomposition part of the coding phase that will design the unique Cdot Matrix (all file formats such as .psd, .ai, .jpeg, .pdf, .bmp etc.) that we use to start coding with the Cdot matrix.

SaaS, also known as cloud-based software or cloud applications, is a web browser, a dedicated desktop client, or an API integrated with a desktop or mobile operating system, which is hosted in the cloud, and is accessed via an API, and which is the digital decomposition part of the coding phase that will ensure that the designed unique Cdot Matrix (all file formats such as .psd, .ai, .jpeg, .pdf, .bmp etc.) that we use to initiate the coding steps for raw materials, components and products, is resistant to all original external conditions.

This stage is a transition bridge that preserves the initial state of the data that transitions to another environment and enables the transition to the coding steps. However, the data obtained at the output during the transmission of a digital data through the communication channel or during the recording process is the redundant information added to the original data.

7.A.2. Coordinate Area—Size—Material Classification

Figure 8:
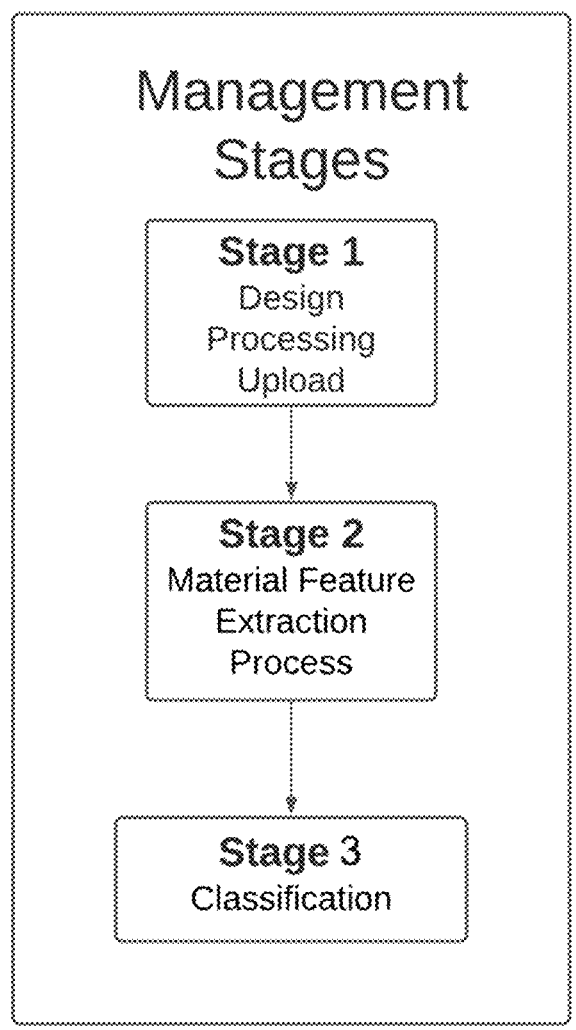
FIG. 8 is a flow diagram showing the three-stage method in the study of identifying and classifying the Unique Cdot Matrix file to be processed.

We follow a three-stage method in the study of identifying and classifying the Unique Cdot Matrix file to be processed on the raw materials, components and products coming from the design input module. The stages of our steps are presented in FIG. 8. Properties such as size and area of the material are extracted from the Unique Cdot Matrix image file that will be processed on the raw materials, components and products. In stage 3, the last stage, the classification of the material is carried out using the data obtained in stage 2.

The size measurement of the design containing a unique Cdot matrix to be applied to the raw material, component, product, or object is determined based on the size of an available surface on the raw material, component, product, or object. Next the number of pixels in the design is established from the digital design file. Next the number of dots per pixel is selected. The number of dots per pixel is determined based on the type of material and surface that the unique Cdot matrix image will be applied to and the size of the unique Cdot matrix image on the surface so that a sufficient number of dots of the Cdot image are presented on the surface. Additional factors may include the intended distance from the surface that a reader device will read the Cdot image from.

7.A.3. Coding Parameter Input

The step may be applied inside the design image to enable the creation of the unique Cdot Matrix image from the design image. This step takes the dots per pixel and the pixels per inch and the design image and creates a data cell matrix for application of the Cdot matrix to the design image.

Figure 9:
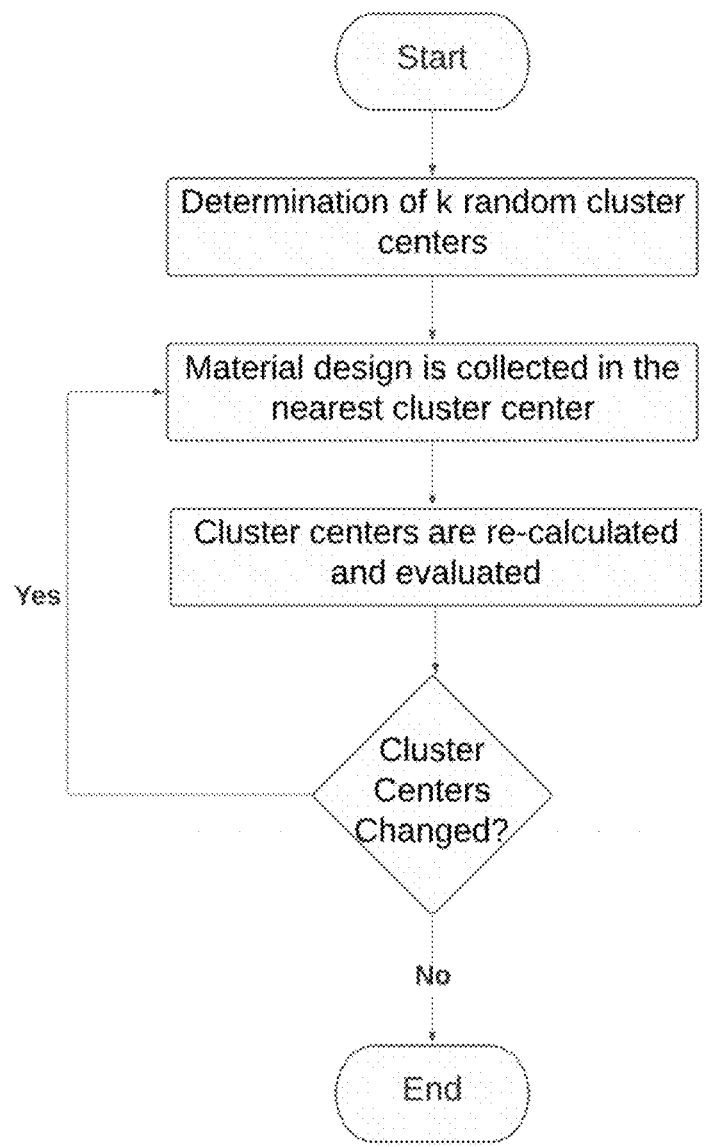
FIG. 9 is a flow chart of the Data Cell Value Assignment Algorithm.

Value Assignment—No Value Assignment Acceleration Measurement and Modeling of Data Cells:

The Data Cell Value Assignment Algorithm is the division of N data cells into K data bits. FIG. 9 shows a flow chart of the Data Cell Value Assignment Algorithm. The Data Cell Value Assignment Algorithm clustering performs partitioning N cells into K data bits in order to minimize the squared error. The main purpose of the Data Cell Value Assignment Algorithm is that the cells in the cluster obtained from partitioning get the maximum bit value and those between the clusters get the minimum bit value. We can express the working process of the Data Cell Value Assignment Algorithm in 4 stages as presented by item-by-item.

1. First, random starting cell centers must be determined for K Data Bits, the distance of the material to the selected cell center points is calculated.
2. According to their distance from the cell center points, all cells are disposed in the closest cell among K cells.
3. The center points of the newly formed cells change according to the data obtained from the average values of all the bits in that cell.
4. Steps 2 and 3 are repeated as long as the center points of the data cells are not fixed.

Clustering performs the generation of cell bits as full data or empty data. Euclidean, Manhattan and Minkowski methods are the most commonly used distance measurement methods in full and empty measurements. Euclidean is the calculation of Manhattan and Minkowski distances. In the invention, a full and empty clustering in cells is used to calculate the distances of cells to data centers and Euclidean distance measurement is used to perform clustering. An information database is created by using the cell bits obtained by design preprocessing, material classification and feature extraction, and the field data calculated as pixels. The data collected in the information database is divided into 3 clusters using the clustering method and the center points of these clusters are determined.

7.A.4. Cdot Matrix Generation and Add Cell Coding a) Cdot Matrix Generation and Algorithm The unique codeword or value (CW) to be embedded into the Cdot Matrix is first put through a one to one function that maps any codeword to a high entropy binary code BC. In the preferred embodiment both CW and BC are a sequence of 16 bytes or 128 bits. As this transformation is not easily reversible, any encoding scheme will not find the initial codeword but the binary code. In practical use, BC will be used to look up for the data relevant to the marked object on a database.

The Cdot Matrix is a messy matrix of possible dot positions. Each dot position can either be black or white, corresponding to ones and zeroes in binary. Some of these dot positions are reserved for the square alignment symbol and top left borders. Additionally, some of these dot positions are reserved for the masking information.

The Unique Cdot Matrix is generated as follows:
1. Place the messy alignment symbol to the top left section of the Cdot Matrix.

The square alignment symbol is a black square that is repeatedly bordered by alternating colors. In the preferred embodiment the innermost square is black and there are 3 layers of alternating color.

2. Calculate Reed-Solomon Error Correction Bits

Reed-Solomon algorithm is used for error correction. The error correction bits are calculated from the binary code and appended to it.

3. Decide Which Mask to Use

The binary code is evaluated over multiple binary masking options. The masking option that maximizes the amount of consequent bit flips after applied to the binary code is decided upon.

4. Place the Mask Information Around the Messy Alignment Symbol

Each possible mask has a binary representation. This representation is added to the Cdot Matrix twice, once horizontally and once vertically next to the messy alignment symbol. An additional dot position on the corner is reserved for a parity bit over the binary representation of the selected mask.

5. Place the Masked Binary Code

The masked binary code appended with the error correction bits is then placed onto the Cdot Matrix (i.e. special ground) bit by bit following the default writing order (left to right then top to bottom). Any dot positions reserved for other uses are skipped over in this process.

The Unique Cdot Matrix Calculation Algorithm Example:

```
generate_special ground (w,h,encoded,pixel_per_dot,on_color,off_color,noise):
    cell_size=32
    cell = Image.new( 'RGB', (cell_size*2,cell_size*2), "white")
    pixels = cell.load( ) # create the pixel map
    ind = 0
    special ground for next matrix = { }
```

```
                for j in range(0,cell_size): # for every col:
                    for i in range(0,cell_size): # For every row
                        if i==0 or j==0: # Outer edge
                            matrix[i,j] = 0
                            if noise and random.randrange(0,2):
                                matrix[i,j] = 1
                            continue
                        if i<=4 and j<=4 and i>1 and j>1: # 3x3 Square
                            matrix[i,j] = 0
                            continue
                        if i<=5 and j<=5: # 5x5 edge
                            matrix[i,j] = 1
                            continue
                        if i<=6 and j<=6: # 7x7 edge
                            matrix[i,j] = 0
                            continue
                        if i<=7 and j<=7: # 8x8 6+6 metadata +1 parity
                            matrix[i,j] = 0
                            continue
                        bit = encoded[ind//8] & (1<<(7-ind%8))
                        if bit>0:
                            val = 1
                        else:
                            val = 0
                        matrix[i,j] = val # set the colour accordingly
                        #print(str(i)+" "+str(j)+" "+str(bit))
                        ind +=1
                # IMPLEMENT MASK SELECTION
                # mask_id = decide_mask(matrix)
                mask_id = 0
                # put mask value into metadata
                if mask_id==1: # example mask
                    matrix[7,1]=1
                # IMPLEMENT MASKING
                for j in range(0,cell_size): # for every col:
                    for i in range(0,cell_size): # For every row
                        if i==0 or j==0: # Outer edge
                            continue
                        if i<=4 and j<=4 and i>1 and j>1: # 3x3 Square
                            continue
                        if i<=5 and j<=5: # 5x5 edge
                            continue
                        if i<=6 and j<=6: # 7x7 edge
                            continue
                        if i<=7 and j<=7: # 8x8 6+6 metadata +1 parity
                            continue
                        matrix[i,j]=apply_mask(matrix[i,j],i,j,mask_id)
                for j in range(0,cell_size): # for every col:
                    for i in range(0,cell_size): # For every row
                        px=2*i+1
                        py=2*j+1
                        if matrix[i,j]>0:
                            color = on_color
                        else:
                            color = off_color
                        pixels[px, py] = color # set the colour accordingly
                constellation = Image.new('RGB', (w,h))
                #cell.show( )
                cell =
cell.resize((cell_size*2*pixel_per_dot,cell_size*2*pixel_per_dot),Image.NEAREST)
                cell_w,cell_h = cell.size
                #cell.show( )
                for i in range(0, w, cell_w):
                    for j in range(0, h, cell_h):
                        # Change brightness of the images, just to emphasise they are unique copies
                        #cell = Image.eval(cell, lambda x: x+(i+j)/1000)
                            #cell.show( )
                        #paste the image at location i, j:
                        constellation.paste(cell, (i, j))
Shaking the cells;
def metod of shake(x):
    p = 305233511999250129067233259518527963777
    g = 154251653446397394414573358985493340603
    pow = g res = 1 two = 1
    for i in range(128):
        if (x & two) != 0:
            res = (res*pow)%p
```

-continued

```
pow = (pow*pow)%p
two = two*2
return (res-1)%p
```

Convert the following functions from time domain (t) to frequency domain (s) and generate frequency domain returned as Vector, matrix or multidimensional array.

If X is of type single, then fft natively computes in single precision, and Y is also of type single. Otherwise, Y is returned as type double.

The size of Y is as follows:
For Y=fft(X) or Y=fft(X,[ ],dim), the size of Y is equal to the size of X
For Y=fft(X,n,dim), the value of size (Y,dim) is equal to n, while the size of all other dimensions remains as in X.

If X is real, then Y is conjugate symmetric, and the number f unique points in Y is ceil((n+1)/2).

Figure 10:
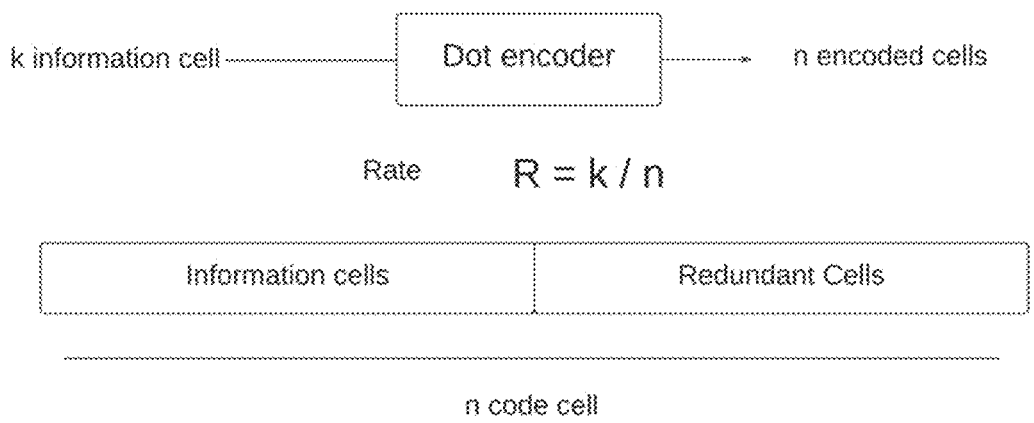
FIG. 10 is a schematic representation of the Dot (Cell) coding calculation.

Y=fft(X) and X=ifft(Y) implement the Fourier transform and inverse Fourier transform, respectively. For X and Y of length n, these transforms are defined as follows:

$$Y(k) = \underset{n \ j=1}{\Xi} X(j) W_{(j-1)(k-1)} X(j) = \underset{1 n_n \ k=1}{\Xi} Y(k) W_n^{-(j-1)(k-1)},$$

where $$W_n = e^{(-2\pi i)/n}$$

is one of n roots of unity.

b) Dot (Cell) Distance—Number—Distance and Pixel Measurement Summation and Calculation Cell codes process information by transferring information from one Dot to another, and the information handled in each Dot is independent of the others. The schematic representation of the Dot (cell) coding calculation is shown in FIG. 10. Dot coding is a memory-free operation, in a sense the code cells are independent of each other. Conversely, the output of the convolutional encoder is dependent not only on the data at the current input, but also on previous inputs and outputs.

Cell codes allow a limited number of errors to be detected and corrected without the need for retransmission. A Dot code converts k binary input cells to n binary output cells (FIG. 30). That is, each bit in the Dot is independent of the previous bit. Since n>k, the selected dot will cause an increase in the dot length. As for the parity bits, these redundant bits will be used by the decoder in error detection and correction. Cell codes are represented as (n, k). In addition, one of the most important concepts determining the performance of channel encoders is the R=k/n equation, which is defined as the code rate. Since n>k, the code rate is less than 1. Cell codes can be classified according to the following features:

Cyclicity: Cyclic codes are a member of the Cell codes family. For a code to be cyclic, a new code word must be formed when the code word is shifted one bit to the right and the rightmost bit is added to the left.

Although a significant increase in performance has been achieved with the use of Dot codes, the use of Cell codes in communication systems design causes some problems due to several disadvantages arising from the structure of Dot codes. These are:

Due to frame compatibility, all transmitted Dots must be received by the receiver before interpreting starts. As a result, an unacceptable delay occurs in the system, especially at large Dot lengths. They need precise (very good) frame synchronization.

The coding process is always done by examining the code part of the relevant information. After the errors are encountered, each Dot is compared with the information sequence obtained at the channel output, and the code closest to the received information is found. This distance is called the Hamming distance.

Decoders used in Cell codes are adapted based on a 0-1 hard decision. In decoders operating based on 0-1 decision, the information received at the channel output will be in binary form (0 or 1), whereas in soft decision decoders, the information received at the output of the channel will be a constant (real) value. In reality, although it is possible to use soft decision decoders in Dot codes, it is not preferred due to the increase in processing complexity.

7.A.5. Bit Color Mapping and Formation
a) Color Combination Formation Array of Design Data Bits In visual interpretation, interpretation is made with attributes such as size, shape, color parallax, texture, pattern, area and association used by the human mind. The quality of the interpretation my vary depending on the user's experience in image evaluation. The cost of interpretation in terms of time units is inversely proportion to the user's experience. Key features that enable us to Form Color Combinations of Data Bits are:

1—Shape (Design)
  Linear coordinates, which are described as the path that emerges when the design is prepared
2—Size
  The length and width of the design and the area it occupies and the decomposed area measure of each linear coordinates
3—Unique Cdot Matrix (Cdot)
  Layer consisting of cells belonging to datasets placed on the design according to size and shape data by repeating itself, where data bits are stored.
4—Color
  a) Main color formation of the design (CMYK-RGB-Spot Color)
  b) The color composition created with the tone combinations in the color world, obtained from the color collection of the determined primary colors, in order to ensure that the data cells that make up the unique Cdot Matrix do not affect the visuality assigned thereto (which will be explained in detail below)
5—Shadow
  High-low tonal differences that make the relative differences in the design
6—Relationships
  It is a collection of intertwined relationships between the shapes in the design and the new design that will be formed by placing the Unique Cdot Matrix layer thereon.

It is a process step where the more the assigned color combinations and the number of Data bit sets in the digitally expressed image, the more human eye's color separation enables the management of the main color perception with the tonal differences of the colors, thanks to its ability to complete an image, especially the gaps in the frequency.

To give a detailed explanation, a clear image is formed, close to the colors that make up the main design.

In addition, the closer the color to be expressed by each dot, the more realistic an image will be obtained. The greater the color range that each dot (pixel) can take, the more that dot will take a color closer to reality in the color pool.

This is called color depth. It is usually expressed as "bits".

A dot with a color depth of 1 bit can take 21=2 colors. (black and white)

A dot with a color depth of 2 bit can take 22=4 colors.
A dot with a color depth of 3 bit can take 23=8 colors.
A dot with a color depth of 4 bit can take 24=16 colors.
A dot with a color depth of 6 bit can take 26=64 colors.
A dot with a color depth of 7 bit can take 27=128 colors.
A dot with a color depth of 8 bit can take 28=256 colors.
A dot with a color depth of 11 bit can take 211=4,096 colors.
A dot with a color depth of 16 bit can take 216=65,536 colors.
A dot with a color depth of 24 bit can take 224=16,777, 216 colors. (approximately 16.7 million)
A dot with a color depth of 32 bit can take 232=4,292, 967,296 colors. (approximately 4.3 billion)

The present invention introduces a color space optimized color aggregation method for color images. In the study, the Cdot algorithm, which is an iterative optimization method for aggregation in the color space, was used by improving it and the method was called as weighted Cdot algorithm.

The histogram information of all the colors on the Cdot Matrix image was generated and the color representing the color classes in each iteration of the Cdot algorithm was calculated as the weighted average color, considering the colors belonging to this class and their frequency of use. In this case, while the color classes were being formed, the colors that were used frequently were dominant and the colors that were used less frequently were recessive.

With the aggregation process, it has been observed that the Cdot algorithm gives better results than the classical color editing algorithm.

There are some hardware standards for color storage library in different Color Space models. In all of these standards, a spot is represented as a point in three-dimensional space. In this space, axes are determined as color (such as red, green, blue), brightness, saturation and hue. Examples of some standard color spaces are RGB, CMY, HSV, HLS, CIE color spaces. Among them, HSV and HLS color spaces are defined in cylindrical coordinates and RGB, CMY and CIE color spaces are defined in cartesian coordinates. RGB color space used in this study consists of red (R), green (G) and blue (B) components, and CIE Lab color space consists of luminance (L), red-green (a) and yellow-blue (b) components.

7.A.6. Reader Display Buffer

The reader device may be updated or determined to comprise a digital image buffer that captures a minimum of 20 images from the device every 1 second. This cache module is an intermediate cache module where received images are stored before being decoded.

The cache module in which the images taken from the reader devices are collected before being deciphered by the reader cameras that read the images on the raw materials, components and products of the Cdot matrix that are physically processed.

The reader device may be a handheld digital camera terminal having a user interface (UI) and display screen, smart phone having at least one camera, or an industrial scanner or camera that can perform a reading operation and that can write the images stored in the reader display buffer to a file transfer protocol for transfer over a network, uploading to the cloud, or storing in a database.

The reader display buffer may be updated or provided with the cache module by special software for the reader device, a plug-in, or a firmware update.

7.B—Decoding

7.B.1 Camera Buffer (Cdot Matrix Image Preprocessing)

Figure 11:
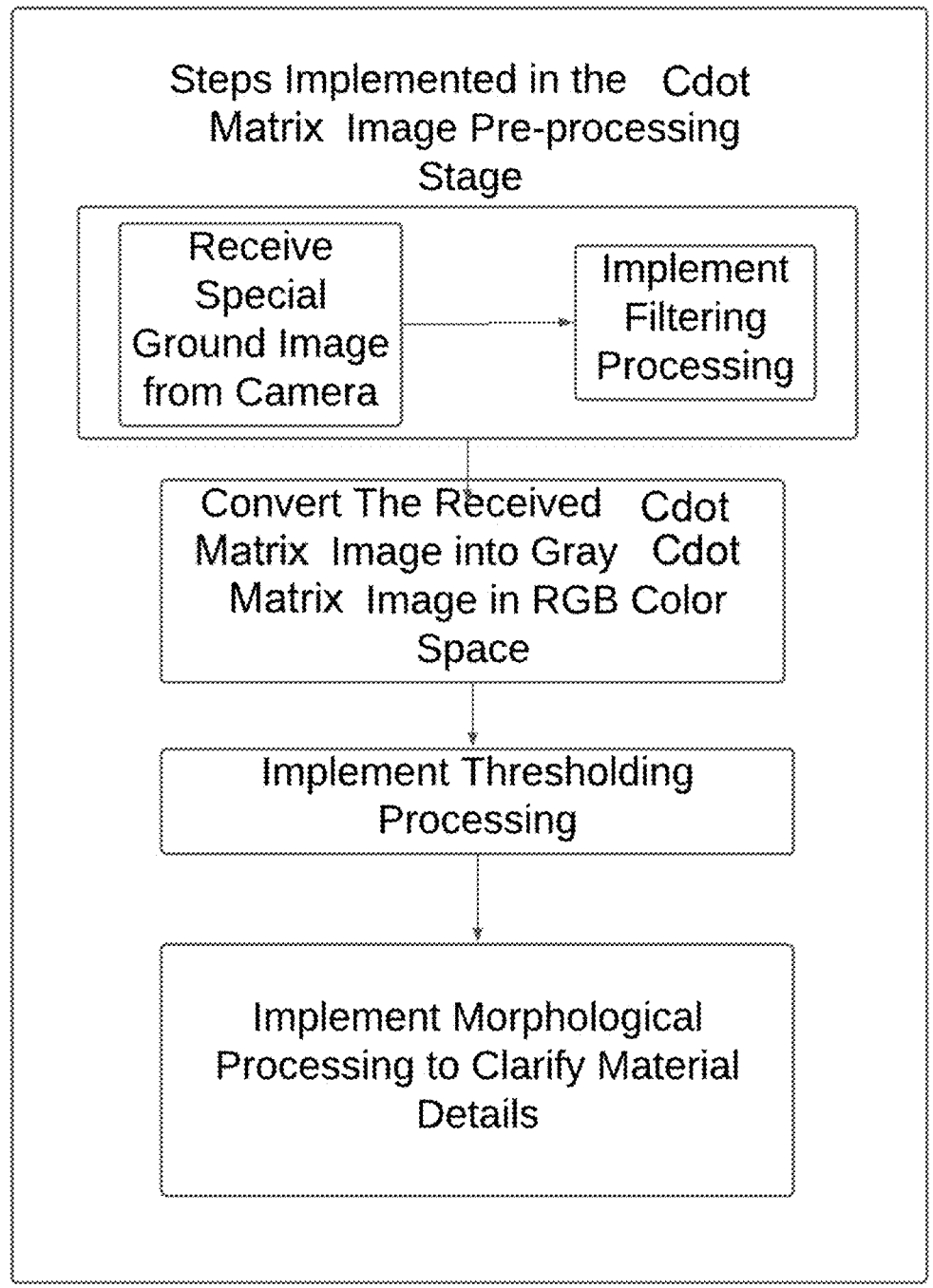
FIG. 11 is a schematic of Cdot Matrix Image Pre-Processing.

FIG. 11 shows the steps for implementing the Cdot Matrix image pre-processing stage. After the Cdot Matrix image is taken from the reading device, hand terminals, smart phone, or industrial cameras, in the filtering step, the external factor noises on the Cdot Matrix image are removed and the unnecessary details in the picture are reduced. On the Cdot Matrix image matrix taken from the camera, the filtering process takes place as a result of navigating a small core matrix, i.e. 3×3, 5×5 etc. In the study, the mean filtering method, which uses a 3×3 core matrix, is used. Choosing a large size of the core matrix reduces the noise on the Cdot Matrix image, but makes blurring. The core matrix chosen for the mean filter application in the study is presented in equation 1. The core matrix is scrolled over the Cdot Matrix image using the sliding window method and new values are calculated for each pixel.

The reader device captures both time and frequency domain values of the Cdot matrix image and also of the unique Cdot matrix by capturing and storing at least 20 images per 1 second in the reader buffer.

$$K = \begin{matrix} 1 & 1 & 1 \\ 1 & 1 & 1 \\ 1 & 1 & 1 \end{matrix} \qquad \text{Equation 1}$$

K refers to the core matrix used for filtering in N×N dimensions, the matrix of the color image taken from the camera, K=the new image matrix formed at the end of the filtering. During the filtering process, negative values will be used in the camera matrix. In this case, the value in the index closest to the relevant indices should be used. For example, during the calculation, K(0,0), which is the closest value in the matrix, is used when multiplying by K(0,0)×IR(−1,−1) for I(0,0). Since the Cdot Matrix image taken from the camera is three-channel and taken in RGB (Red, Green, Blue) color space, the values found for the three colors in the BMP image matrix are updated using their calculations. After the filtering process, the step of graying the color image is performed.

On the resulting gray image, thresholding is performed and only the parts of the relevant points are used. The smallest (min) and maximum values (max) used in the thresholding process are determined. By comparing whether the pixel values in the gray image are between min and max values, a new value assignment is performed for the binary image.

After thresholding, an image containing black and white colors is generated. On the Cdot Matrix image, there are undesirable white dots in the black regions and undesirable black dots in the white regions. Morphological processing is applied in order to remove the noise on the resulting binary image.

In the morphological process, 2×2, 4×4, etc. square matrix, which is called structural element, is scrolled on the binary image which is provided as input. In the morphological processing step, the Cdot Matrix image is updated by using neighboring pixel values in the binary image values and structural element. In the processing process, morphological processes of erosion and dilation are applied on the binary image.

The erosion is used to narrow the white areas on the binary image and to clear the white areas in the black areas. The dilation, on the other hand, expands the borders of the white areas, while clearing the black spots in the white area.

The Cdot Matrix image formed as a result of applying filtering, graying, thresholding and morphological processes to the raw image taken from the camera is presented. With the resulting image, the Coordinate Area—Dimension of the edges of the raw materials, components and products in the environment is determined and made ready for feature extraction.

Clustering is a process of grouping, as with or without data.

Data clustering is also known as cluster analysis. In cluster analysis, grounds, points or materials are naturally grouped. With the cluster analysis, data containing multivariate features can be clustered. In the clustering method, pattern recognition, data analysis, imaged material is classified using its features such as area, diameter, radius, width, height, etc.

7.B.2 Partitioning or Dividing of Different Layers into Color Cells

This step differentiates the dots in each cell. Using the 20 pictures captured per second, the images are filtered and decomposed into pixels or cells. The dots are captured in the cell and then combines across images.

With our methods, the details of which have been given before, binary or multiple clustering of gray-level images can be performed. However, since color images consist of three separate channels, each channel will have its own threshold. Even if thresholds are obtained for each channel, the use of said information to form meaningful clusters is a major challenge. On the other hand, in the algorithm proposed in our invention, it is combined with single threshold information obtained from each channel. In other words, the color is divided into small cell or cells. Then, every pixel in the sub-cell or cells is included in the same cluster or class. It seems that the size of each sub-cell or cells depend on the threshold of each channel, and are not identical. Thus, the size of the sub-cells or cells is related to the distribution of pixel intensities in the Cdot Matrix image. It is clear that the homogeneity of clusters with larger dimensions will be lower than clusters with smaller dimensions. If the size of each cell is reduced by increasing the number of thresholds, the homogeneity of the classes to be formed will also increase. Thus, multi-level thresholding would be an important solution. On the other hand, the maximum number of classes to be obtained for colored picture will be C=(m+1)3. Each pixel in the Cdot Matrix image corresponds to a point in the color set. Accordingly, since only one threshold is used (m=1), eight subsets will be formed.

If the threshold number is m=2, Cm=27, and if m=3, 64 subsets will be generated. The same principles can be extended to single-threshold partitioning of color cells for multi-level thresholds. The partitioning rules of color cells with a single threshold and the class labels to be formed are shown in Table 1.

TABLE 1

Partitioning of color cells

| Class Label | Rules | Assigned Color |
|---|---|---|
| S0 | if (R <= Tr & G <= Tg & B <= Tb) | 0x000000 |
| S1 | if (R <= Tr & G <= Tg & B >= Tb) | 0x0000FF |
| S2 | if (R <= Tr & G >= Tg & B <= Tb) | 0x00FF00 |
| S3 | if (R <= Tr & G >= Tg & B >= Tb) | 0x00FFFF |
| S4 | if (R >= Tr & G <= Tg & B <= Tb) | 0xFF0000 |
| S5 | if (R >= Tr & G <= Tg & B >= Tb) | 0xFF00FF |
| S6 | if (R >= Tr & G >= Tg & B <= Tb) | 0xFFFF00 |
| S7 | if (R >= Tr & G >= Tg & B >= Tb) | 0xFFFFFF |

7.B.3 Progressive Code Locator Detection and Location Determination

We designed code locators to assist in localizing the dots. Therefore it should be noted that we need to find the center so that the locators can realize the correct position, color cell decoding. The position of each Dot instead of positions on the edge.

This is because the edge positions are easily blurred on the screen, and the position of a Dot is in parallel with the center position of the Dot in this design to prevent captured images that drastically affect the color recognition of each. Captured images may be seriously damaged, distorted from perspective. Code locator is based on a progressive localization algorithm upper locator, which gradually localizes each locator, to solve the problem, and compensates for localization errors to achieve its correct position:

Step 1: Calculate the position of the next code locator based on the position of the first code locator;

Step 2: Recalculate the position of the code locator using Location correction algorithm and then calculate, the position of the new code locator relative to an existing code will be the corrected position of the locator.

Step 3: Repeat step 2 until the last code locator in this section.

We explain how to calculate the position of a code locator (example+1) relative to the position of the upper code locator (for example value=5) (x5, y5) and (x5+1, y5+1) respectively i-th and (i+1)-th code locators. Code locator for specifying the vertical length of the design. Since two adjacent code locators are separated by one, we get the colored Dot. (x5+1, y5+1)=(x5, y5+2·cells).

However, the calculated position may not be the central position of the code locator due to perspective distortion. In order to get its correct position, we recommend a position correction. A Cdot finding algorithm is used to reduce localization error caused by the perspective.

The algorithm is based on the following observation:

The basic idea is to find the three corner points first. We search the midpoint to find the center positions of the left and right corner tracers and then the first code locator. We specify the midpoint of the P left center locations of the Cdot Matrix image and scan the pixels with the right corner tracers. The rectangle is also centered P with a side length of 3, line by line, starting from the top left pixel. Cell, here the cell is an average of the vertical length of the first code locators, in the left and right columns we select the center cell. We then use the localization accuracy and resource consumption as the side length of the rectangle, which is a compromise. Finding the first code locator can improve accuracy but will require more computation time and resources. In our invention, we find the 3 corners and center points of the Cdot Matrix image, confirming that it is a good choice, and start scanning after calculating the side length of the rectangle. Top left pixel, if it is not black, we continue to scan the next. When a null pixel comes, we look for pixels again in four successive directions.

Current pixel, it should be noted that the current pixel can only be a noise. The point that can be discarded and recovered with the method used, the top and bottom edges, a distorted left and right edges are still parallel to the point center, so a cell center does not change after its position is disturbed.

The position correction algorithm runs as follows:
Step 1: Find the pixels inside a centered rectangle.
(x value+1, y value+1) side length with cell;
Step 2: (x value+1, y value+1) recalculate as the average of positions the number of black and colored pixels within the rectangular area;
Step 3: (x value+1, y value+1) repeat Steps 1 and 2 until the nearest number, the position correction algorithm is repeated until it reaches a significant value The position correction algorithm can reach the near value as follows:

All the positions of the code locators in the left column are calculated one by one, until the code locators are gradually found. Similarly, the positions of the code locators are determined by repeating over the right column. Next, it will be explained separately how to calculate the positions of the code.

Locators in the middle column; the middle column must be calculated first to find the first code locator therein. The pixels surrounding the midpoint of the cells in the left and right center positions are terminated by scanning step in all directions and a precise value is achieved.

Scans are applied sequentially with up, left, down, and right movement directions until it is found that a pixel is not black.

In fact, the pixels sought in the four directions are a square. In our system, the minimum value of the size of a cell B min and B max and the maximum Dot dimensions are calculated respectively in a transmitter-adaptive manner. Then, if we assign B min≤bu+bd≤B max and B min≤b1+br≤B max, we can now conclude that the black pixels searched belong to the first code value. Locator; otherwise, they are just noise spots. Once the first code locator is found, it can readily use our position correction algorithm and it can be gradually localized using the middle column to find the center position and then other code locators. Subsequently, it will be possible to proceed with other analysis steps.

Afterwards, other steps can be performed:

7.B.3.a) Frame Synchronization

Frame synchronizer recognizes the Unique Cdot Matrix and classifies data into small sets or sub-sets. It typically follows the frame synchronization model as the sub-frame ID, which determines which small or subset is detected in the series. This becomes increasingly important during the decommissioning phase, where all data is deciphered depending on which small group of full or empty clusters is sampled. Different combinations require a constant awareness of which part of the main frame is being decoded. It uses special bit patterns to indicate the start and end of the frame with bit padding.

7.B.3.b) Corner Tracer Detection

It extracts approximately 2000 region suggestions using a segmentation algorithm called selective search to find which parts of the Cdot Matrix image are most likely to contain a Cdot Matrix. Selective Search implements a variety of different cyclic trackers so that it can process as many small pattern sets as possible. The algorithm scans the Cdot Matrix image with windows of various scales and looks for adjacent pixels that share colors and patterns while simultaneously considering external factor conditions.

7.B.3.c) Perspective Distortion

FIG. 12 is a schematic representation of the usage flow architecture of the system of the invention. FIG. 12 includes these references: 50.1 Reader device; 50.2; Coding 50.3 Decoding; 50.4 Output.

In FIG. 12 is an overview of our system, which we refer to as a coded image, in the context of a typical usage flow: Inputs are an image and a desired bridge.

First, a unique sequence of bits is assigned to the bridge.

Secondly, coding 50.2 is used to embed the bit string in the target image. This generates a coded image that is ideally perceptually identical to the input image. The coding 50.2 is implemented as a trained coding with a specially developed mathematical algorithm using the gaussian mixture model, and with a second network implementing interpreting 50.3.

Third, the coded image is processed onto raw materials, components and products and associated with the real world.

Fourth, the user reads the material through a decoding unit.

Fifth, the system uses an image detector 50.1 to identify and crop all images.

Sixth, each image is processed with coded image 50.2 decoding 50.3 to obtain the unique bit string used to follow assign unique object or material identification and classification.

In our invention, spatial image distortions at the level of suitable pixels that successfully address the problems with the "transmission of coded image onto raw materials, components and product" (i.e., by processing the coded image onto raw materials, components and products, or display and subsequent image capture) between the coding 50.2 and decoding 50.3 are eliminated without any problems. As a result, 95% of the 128 bits coded in real-world conditions are resistantly captured while maintaining excellent perceptual image quality. Our method assumes that the coded image will be corrupted by a display pipeline between the encoding 50.2 and decoding 50.3 steps. Hidden and Light Field Messaging (LFM), minor image manipulations or distortions would render existing techniques useless as their purpose is to encode a plurality of bits into full and empty cells in the context of perfect digital transmission. Between coding 50.2 and decoding 50.3, it is able to recognize various types of external influences.

Coding 50.2 relates any two images of the same flatwise surface to a homography, assuming the camera model. The Decoding 50.3 generates random homography to simulate the effect of an incompletely aligned camera to decode the coded image 50.1. Coding 50.2 keeps the three vertex positions of the transmitted image within a fixed range (max±40 pixels, i.e. ±10%) to illustrate this homography, and then Interpreting the homography, the original vertices of which are mapped to their new positions. The Interpreting 50.3 thus re-samples the original image in two times to generate the perspective distorted image.

7.B.3.d) Motion and Focus Blur

Blur can be caused by both camera movement and incorrect auto-focus. The Decoding 50.3 samples a random angle to simulate motion blur and generates a straight line blur kernel with a width between 3 and 7 pixels. The Decoding 50.3 uses a Gaussian blur kernel to simulate misfocusing, randomly sampling the standard deviation from 1 to 3 pixels.

7.B.3.e) Color Manipulation

Displays have a limited gamut compared to the full RGB color space. Cameras manipulate their output using exposure settings, white balance, and a color correction matrix.

The Decoding 50.3 estimates these distortions with a series of random affine color transformations (constant across the entire image) as follows:
- Tone shift: [−0.1, 0.1].
- Desaturation: Random linear interpolation between the full RGB image and its grayscale equivalent
- Brightness and contrast: affine histogram rescaling mx+b and m~U[0.5, 1.5] and b~U[−0.3, 0.3]

7.B.3.f) Vibration and Shaking

Vibration and shaking induced by camera systems are well studied and include photon jitter, dark image and shooting jitter. The Decoding 50.3 assumes standard non-photon starved imaging conditions using a Gaussian noise model (sampling the standard deviation) as a solution. The Decoding [50.3] uses (σ~U[0, 0.2]) to account for image noise.

7.B.4 Assertive Code Extraction

After obtaining the locations of the code locators, the next step is to decode the coded values in the code area. This phase consists of two steps. The code locators generate columns in the code area from a captured image, basically using the code locators on the left and right instead of localizing all the Dots, to improve the localization accuracy of the color recognition cells and localization of each cell. The system generates the columns in the code area using the left and middle code locators. Instead of localizing Dots in the left half code area, the system generates code locators in the middle and right columns and columns in the right half code area. With this method, assertive inference of code values is performed by columnizing the dots instead of localizing the dots.

The assertive code extraction works on the Cdot matrix image that is produced from the image processing of the image captured from the camera. The main function of this stage is that a certain part of the product surface may be damage or subject to a process, especially due to the external factors that provide harsh conditions to the surface.

Certain elements of the matrix may have been lost certain values or been damaged. This may allow for damages to be corrected and the assigned unique code to be detected.

7.B.5 Forward Error Detection and Correction

Error detection is is applied to the image encoded with Cdot matrix.

To calculate forward error correction syndromes faster, the polynomial equation C(X) is divided by a generating polynomial G(X) to create a remaining polynomial R(X). The remaining polynomial R(X) is then used to accelerate the computation of the syndromes. A method of dividing an Nth degree dividing polynomial into a 2R degree dividing polynomial is also described. Additionally, to further accelerate the computation of the syndromes, the generating polynomial is split into a number of subpolynomials Gj(X) to give a set of remaining subpolynomials Rj(X) used to calculate the syndromes. The calculation of syndromes using evaluation according to Horner's rule and their generalization are also described.

Forward Error Detection and Correction for this in phase, the algorithm steps shown below are applied:
1. Syndrome Calculation
2. Berlekamp Massey Algorithm for finding the error-locator polynomial
3. Chien Search Algorithm for finding the roots of the error-locator polynomial
4. Forney algorithm for calculating error sizes 7.B.6 Data Interpretation It is the stage that ensures that the meaningful value assigned by the user during the coding phase of the analyzed data is synchronized with the unique object or material identification and classification definition to be fixed with the Hex value produced by the system, and recorded as a meaningful data code by recording it in the database.

7.B.7 Data Association

It is the stage that ensures that the analyzed data is synchronized with the tracking ID value on the core system, which is associated with its counterpart in the database.

7.B.8 Output Data

It is the last stage that provides the output result of the meaningful data sent to the device screens where the reading process is performed.

This steps, If it is a handheld terminal that performs the reading operation, it is the UI of a decoded response of the code displayed on the display screen of the handheld terminal.

If the mobile performing the Reading operation is a mobile phone, it is the UI of a decoded response of the reading application in that phone.

If it is an industrial camera that performs the Reading operation, it is the recording value that will be written into the FTP or a database that this camera provides transferring.

In the invention, firstly an encoder network processes the input image and assign a unique sequence of bits as a coded image. The coded image is then transferred onto the material with application techniques. In our invention, Laser Carving, UV Printing, Screen Printing, Rotary Printing, Pigmented Reprint with in all these techniques, raw materials, components and product surfaces may be coded without deteriorating product quality and structure, without deteriorating product quality and structure. Images of the unique Cdot matrix image are captured by the camera 50.1 through the reading device having a buffer that captures at least 20 images per 1 second. A detection network localizes and corrects coded image before passing it to the decoder network. 50.2 After the bits are recovered and the error is corrected, the user can follow the bridge. To test the encoder 50.2 and decoder 50.3 networks, the coded image is simulated by a series of differentiable image enlargements caused by processing, re-imaging and detection of raw materials, objects, components and products, distortions. 50.4.

The Unique Cdot Matrix Surface is calculated by the encoder network and added back to the original image to generate coded image. These samples have 128-bit coded values and are resistant to image distortions caused by processing onto raw materials, components and products, and by external factors.

In our invention, the encoding and decoding of all and/or a specified part of the surfaces of raw materials, components and products is provided. In this way, its assigned unique object or material identification and classification is provided permanently.

With the invention, 100% solution can be provided for the raw materials, components and materials that are exposed to difficult and complex industrial processes in the industrial production world, being the Production Processes with The Hardest Reading Conditions namely Axial Non-Uniformity, Angle of Distortion and Grid Non-Uniformity, Symbol and Cell Contrast, Wrong Reading Position, Damage and Distortion, Modulation and Reflection Margin problems, Alternative Methods Applied if Low Contrast Cannot be Avoided and the Problems They Create, Surfaces That May Cause Low Reflection Margin; including Metallized Coating, Electrostatic Powder Painting, Wet Paint Coating, Enamel, Glazing Processes, as described below. If it is necessary to prove them as the main test models; it uses a new method model to cover all of the encoding and decoding steps given above in detail with reference to the drawings and description.

Our invention can be applied to design files in any format, it is compatible with all color combinations such as CMYK, Spot Color, Gray Scale and does not require any special rules, and scanning an area of minimum 2 mm² is sufficient in the scanning process, and Symbol and Cell Contrast, Wrong Reading Position, Damage and Distortion, Modulation and Reflection Margin problems, Alternative Methods Applied if Low Contrast Cannot be Avoided and the Problems They Create, Surfaces That May Cause Low Reflection Margin; It does not need scanning of the entire surface of raw materials, components and products, which are exposed to difficult and complex industrial processes in the industrial production world, including Metallized Coating, Electrostatic Powder Painting, Wet Paint Coating, Enamel, Glazing Processes, which are the production processes where the most difficult reading conditions arise. It has features such as the ability to get results with the moving scanning process.

In our invention, the methods we use automatically learn how to conceal and transmit data resistantly against many different situations, producing solutions to all variations such as combinations of camera, illumination and viewpoints.

In our invention, by using the application techniques mentioned above, a system that provides a solution to the problems and variations in traceability, interaction, sustainability, size, resistance to external conditions (dust, hot cold temperature differences), lighting, shadows, perspective, closure and tracking distance, due to the Unique Cdot Matrix placed on the products and is independent of the design and size, which works in harmony with the file formats of the machines that perform the unique Cdot Matrix process placed on the raw materials, components and materials and elements that are exposed to difficult and complex industrial processes in the industrial production world, being the Production Processes with The Hardest Reading Conditions namely Axial Non-Uniformity, Angle of Distortion and Grid Non-Uniformity, Symbol and Cell Contrast, Wrong Reading Position, Damage and Distortion, Modulation and Reflection Margin problems, Alternative Methods Applied if Low Contrast Cannot be Avoided and the Problems They Create, Surfaces That May Cause Low Reflection Margin; including Metallized Coating, Electrostatic Powder Painting, Wet Paint Coating, Enamel, Glazing Processes is provided.

In our invention, by also using the laser carving technique, with the Unique Cdot Matrix which works in harmony with all file formats and placed on the raw materials, components and materials and elements that are exposed to difficult and complex industrial processes in the industrial production world, being the Production Processes with The Hardest Reading Conditions namely Axial Non-Uniformity, Angle of Distortion and Grid Non-Uniformity, Symbol and Cell Contrast, Wrong Reading Position, Damage and Distortion, Modulation and Reflection Margin problems, Alternative Methods Applied if Low Contrast Cannot be Avoided and the Problems They Create, Surfaces That May Cause Low Reflection Margin; including Metallized Coating, Electrostatic Powder Painting, Wet Paint Coating, Enamel, Glazing Processes, all inputs created on all surfaces and floors, whether based on area(s) or regardless of area(s), these inputs and the Unique Cdot Matrix on the floor where these inputs are located are detected.

In summary, it is obvious that it is a solution that is not available in the new and existing solutions as revealed by the system of our invention in the following;

Unique Cdot Matrix (with Unique Object or Material Identification and Classification) that can be applied differently according to the raw materials, components and materials and elements that are exposed to difficult and complex industrial processes in the industrial production world, being the Production Processes with The Hardest Reading Conditions namely Axial Non-Uniformity, Angle of Distortion and Grid Non-Uniformity, Symbol and Cell Contrast, Wrong Reading Position, Damage and Distortion, Modulation and Reflection Margin problems, Alternative Methods Applied if Low Contrast Cannot be Avoided and the Problems They Create, Surfaces That May Cause Low Reflection Margin; including Metallized Coating, Electrostatic Powder Painting, Wet Paint Coating, Enamel, Glazing Processes, compatibility with all color combinations, Unique Cdot Matrix can be applied to different surfaces of a raw material, component and product so that they can be Unique Object or Material Identification and Classification differently without disturbing their physical structure, 100% solution to difficult and complex industrial processes in the industrial production world, and the external factors, being the Production Processes with The Hardest Reading Conditions namely Axial Non-Uniformity, Angle of Distortion and Grid Non-Uniformity, Symbol and Cell Contrast, Wrong Reading Position, Damage and Distortion, Modulation and Reflection Margin problems, Alternative Methods Applied if Low Contrast Cannot be Avoided and the Problems They Create, Surfaces That May Cause Low Reflection Margin; including Metallized Coating, Electrostatic Powder Painting, Wet Paint Coating, Enamel, Glazing Processes, with the techniques and methods explained above with drawings and detailed descriptions, providing one hundred percent of the Unique Object or Material Identification and Classification data to be resolved by scanning a limited or partial piece of the Unique Cdot Matrix, which has been processed and transferred onto a raw material, component and product, without the requirement to scan the entirety thereof, even with the motion scanning process of a certain part, scanning an area of 2 mm² in the scanning process is sufficient.

Areas of Use of the Invention:

Below are given examples as to how the system can be adapted to the raw materials, components and materials and elements that are exposed to difficult and complex industrial processes in the industrial production world, being the Production Processes with The Hardest Reading Conditions namely Axial Non-Uniformity, Angle of Distortion and Grid Non-Uniformity, Symbol and Cell Contrast, Wrong Reading Position, Damage and Distortion, Modulation and Reflection Margin problems, Alternative Methods Applied if Low Contrast Cannot be Avoided and the Problems They Create, Surfaces That May Cause Low Reflection Margin; including Metallized Coating, Electrostatic Powder Painting, Wet Paint Coating, Enamel, Glazing Processes.

In accordance with an exemplary embodiment of the present invention, a Unique Object or Material Identification and Classification is placed directly on the raw materials, components and products. When recognized by an appropriately enabled reading device, this Unique Object or Material Identification and Classification automatically redirects to the target of the associated output data flow. The target, for example, can provide services such as a web services, product tree structure of the raw materials, components and products, product functions, product critical traceability values, process control, etc. With this method, effective tools are provided for manufacturers and consumers, examples of which are given below.

The system of the invention can be used in many applications. For example;

A. It may connect Unique Cdot Matrix in file formats suitable for machines for Laser Carving, UV Printing, Silkscreen Processing, Rotary Printing, Pigmented Repeat Printing vector and/or all this techniques to the defined data networks, and systems such as MRP, ERP, CRM, of the raw materials, components and materials and elements that are exposed to difficult and complex industrial processes in the industrial production world, being the Production Processes with The Hardest Reading Conditions namely Axial Non-Uniformity, Angle of Distortion and Grid Non-Uniformity, Symbol and Cell Contrast, Wrong Reading Position, Damage and Distortion, Modulation and Reflection Margin problems, Alternative Methods Applied if Low Contrast Cannot be Avoided and the Problems They Create, Surfaces That May Cause Low Reflection Margin; including Metallized Coating, Electrostatic Powder Painting, Wet Paint Coating, Enamel, Glazing Processes.
(SAP, Oracle, Process Control Platforms, IoT Management Platforms, User Interaction Data Networks, After Sales Service Management modules etc.)

B. It may take the inventory on the production lines, in logistics processes, in warehouses, at the point of sale for; Unique Cdot Matrix in file formats suitable for machines for Laser Carving, UV Printing, Silkscreen Processing, Rotary Printing, Pigmented Repeat Printing, Vector and/or all this techniques over the raw materials, components and materials and elements that are exposed to difficult and complex industrial processes in the industrial production world, being the Production Processes with The Hardest Reading Conditions namely Axial Non-Uniformity, Angle of Distortion and Grid Non-Uniformity, Symbol and Cell Contrast, Wrong Reading Position, Damage and Distortion, Modulation and Reflection Margin problems, Alternative Methods Applied if Low Contrast Cannot be Avoided and the Problems They Create, Surfaces That May Cause Low Reflection Margin; including Metallized Coating, Electrostatic Powder Painting, Wet Paint Coating, Enamel, Glazing Processes.

C. It may provide product traceability with Unique Cdot Matrix in file formats suitable for machines for Laser Carving, UV Printing, Silkscreen Processing, Rotary Printing, Pigmented Repeat Printing, vector and/or all this techniques over the raw materials, components and materials and elements that are exposed to difficult and complex industrial processes in the industrial production world, being the Production Processes with The Hardest Reading Conditions namely Axial Non-Uniformity, Angle of Distortion and Grid Non-Uniformity, Symbol and Cell Contrast, Wrong Reading Position, Damage and Distortion, Modulation and Reflection Margin problems, Alternative Methods Applied if Low Contrast Cannot be Avoided and the Problems They Create, Surfaces That May Cause Low Reflection Margin; including Metallized Coating, Electrostatic Powder Painting, Wet Paint Coating, Enamel, Glazing Processes.

D. It may associate sustainability information to ensure production optimization with Unique Cdot Matrix in file formats suitable for machines for Laser Carving, UV Printing, Silkscreen Processing, Rotary Printing, Pigmented Repeat Printing, Vector and/or all this techniques over the raw materials, components and materials and elements that are exposed to difficult and complex industrial processes in the industrial production world, being the Production Processes with The Hardest Reading Conditions namely Axial Non-Uniformity, Angle of Distortion and Grid Non-Uniformity, Symbol and Cell Contrast, Wrong Reading Position, Damage and Distortion, Modulation and Reflection Margin problems, Alternative Methods Applied if Low Contrast Cannot be Avoided and the Problems They Create, Surfaces That May Cause Low Reflection Margin; including Metallized Coating, Electrostatic Powder Painting, Wet Paint Coating, Enamel, Glazing Processes.

E. It may access all product-related information (year of manufacture, place of manufacture, price, technical specifications, ingredients, all content that the manufacturer defines and wants to associate with the customer) with Unique Cdot Matrix in file formats suitable for machines for Laser Carving, UV Printing, Silkscreen Processing, Rotary Printing, Pigmented Repeat Printing, vector and/or all this techniques over the raw materials, components and materials and elements that are exposed to difficult and complex industrial processes in the industrial production world, being the Production Processes with The Hardest Reading Conditions namely Axial Non-Uniformity, Angle of Distortion and Grid Non-Uniformity, Symbol and Cell Contrast, Wrong Reading Position, Damage and Distortion, Modulation and Reflection Margin problems, Alternative Methods Applied if Low Contrast Cannot be Avoided and the Problems They Create, Surfaces That May Cause Low Reflection Margin; including Metallized Coating, Electrostatic Powder Painting, Wet Paint Coating, Enamel, Glazing Processes.

F. It may access product tree information with Unique Cdot Matrix in file formats suitable for machines for Laser Carving, UV Printing, Silkscreen Processing, Rotary Printing, Pigmented Repeat Printing, Vector and/or all this techniques over the raw materials, components and materials and elements that are exposed to difficult and complex industrial processes in the industrial production world, being the Production Processes with The Hardest Reading Conditions namely Axial Non-Uniformity, Angle of Distortion and Grid Non-Uniformity, Symbol and Cell Contrast, Wrong Reading Position, Damage and Distortion, Modulation and Reflection Margin problems, Alternative Methods Applied if Low Contrast Cannot be Avoided and the Problems They Create, Surfaces That May Cause Low Reflection Margin; including Metallized Coating, Electrostatic Powder Painting, Wet Paint Coating, Enamel, Glazing Processes.

G. It may control product information with Unique Cdot Matrix in file formats suitable for machines for Laser Carving, UV Printing, Silkscreen Processing, Rotary Printing, Pigmented Repeat Printing, Vector and/or all this techniques over the raw materials, components and materials and elements that are exposed to difficult and complex industrial processes in the industrial production world, being the Production Processes with The Hardest Reading Conditions namely Axial Non-Uniformity, Angle of Distortion and Grid Non-Uniformity, Symbol and Cell Contrast, Wrong Reading Position, Damage and Distortion, Modulation and Reflection Margin problems, Alternative Methods Applied if Low Contrast Cannot be Avoided and the Problems They Create, Surfaces That May Cause Low Reflection Margin; including Metallized Coating, Electrostatic Powder Painting, Wet Paint Coating, Enamel, Glazing Processes.

H. It may ensure traceability, supply chain efficiency, sustainability, interaction and authentication in all sectors below, with Unique Cdot Matrix in file formats suitable for machines for Laser Carving, UV Printing, Silkscreen Processing, Rotary Printing, Pigmented Repeat Printing, Vector and/or all this techniques over the raw materials, components and materials and elements that are exposed to difficult and complex industrial processes in the industrial production world, being the Production Processes with The Hardest Reading Conditions namely Axial Non-Uniformity, Angle of Distortion and Grid Non-Uniformity, Symbol and Cell Contrast, Wrong Reading Position, Damage and Distortion, Modulation and Reflection Margin problems, Alternative Methods Applied if Low Contrast Cannot be Avoided and the Problems They Create, Surfaces That May Cause Low Reflection Margin; including Metallized Coating, Electrostatic Powder Painting, Wet Paint Coating, Enamel, Glazing Processes.
   a. Automotive and Automotive Parts
   b. Passenger and Commercial Vehicle Tire Industry
   c. Consumer Durables and White Goods
   d. Commercial Vehicles, Transportation, Two Wheelers, Watercrafts
   e. Tool and Mold Making
   f. Construction Industry and Building Materials
   g. Electronics, Display, Computer Parts, Semiconductors
   h. Phones
   i. Machine and System Production
   j. Air Conditioning and Energy Technology
   k. Medical Technology
   l. Jewelry and Watches
   m. Metal Industry
   n. Extrusion, Manufacturing and Conversion Industries
   o. Shipping
   p. Aviation, Space and Aerospace products
   q. Kitchen and Home Appliances
   r. Personal Care and Health Products
   s. Garden Products, Heating and Cooling Products, Hardware, Machinery and Hand Tools, Furniture and Decoration, Lighting and Electro, Safety Equipment, Sporting Goods and Products
   t. Textile and Apparel Industry Sectors where the invention can be used:

Automotive and Automotive Parts:

The automotive industry is one of the industries that most need raw materials in the world. Automotive exteriors, automotive interiors, machinery parts, automotive heat exchangers, batteries, wheels and many other parts are produced using the raw materials. At the same time, the number of component parts used in the assembly of an automobile is very high. Beyond the basic parts such as the engine and transmission, there are also parts such as the wiring that are used to connect the parts, seats, dashboards, and heating, ventilation and air conditioning. In terms of product formation stages, the automobile industry means a very wide range of production, extending to the raw material manufacturer. Companies that produce the raw materials convert the raw materials into materials that automakers can use. The produced materials are sold to auto part sub-manufacturers or directly to automotive manufacturers. Steel, aluminum, rubber, plastic and glass are the products that are most commonly used in automobiles. Steel made from iron ore and aluminum are the most widely used inputs in automobile body, door panels, roof, beams between doors, mufflers, wheels and exhaust pipes. Plastics are found in numerous car parts such as door handles, airbags, dashboard, and air vents. While aluminum is an indispensable material of wheels and engine blocks, glass made of sand and quartz is used in side and roof windows of the car. Rubber, on the other hand, is used to make many belts, hoses, and seals critical for the automobile. The automotive supply chain is one of the most complex one in the world. The worldwide distribution chain of suppliers, manufacturers and other third parties is becoming more global. Globalization has greatly increased the need to track at all times where automotive parts are exactly found. In the flow of raw materials, parts and products between auto suppliers, manufacturers and other third parties, all parties need to receive parts quickly, process and monitor them throughout the entire process. Although various methods are used to monitor millions of parts produced, we are talking about an industry where parts with the above-mentioned features are quite common. Curved and inclined (Convex, Concave, Cylindrical and Saddle) material surfaces, light-colored materials and surfaces, reflective materials and surfaces, transparent materials and surfaces, rigid and durable materials and surfaces, textured materials and surfaces constitute parts that are widely used in industry. Steel, aluminum, rubber, plastic and glass raw materials, parts and products, featuring such properties to a large extent, are among the materials where the invention will find the highest degree of application in the automobile industry. The invention also provides the benefits of automobile supply chain efficiency, traceability, user interaction, sustainability, controlling product authenticity of the parts by enabling that data is inserted in and read on all sub-parts and products of the automobile made from these materials.

Commercial Vehicles and Transportation, Two Wheelers, Watercrafts:

In the flow of raw materials, parts and products between manufacturers, suppliers and other third parties of trucks, closed trucks, semi-trailer trucks (articulated trucks), pick-up trucks, buses, subways, all types of train and train wagons, cable cars, rail vehicles, trailers, automobile carriers, heavy equipment and machinery used in mining, construction and farming, vehicles used in disaster situations, vehicles used in fuel transportation, caravans and travel trailers, vessels, boats, zodiac, ships, ferries, rowing boats, yachts, sailboats, motorcycles, bicycles, limousines, all parties need to receive parts quickly, process and monitor them throughout the entire process. Although various methods are used to monitor millions of parts produced, we are talking about industries where parts with the above-mentioned features are quite common. Curved and inclined (convex, concave, cylindrical, and saddle) material surfaces, light-colored materials and surfaces, reflective materials and surfaces, transparent materials and surfaces, hard and durable materials and surfaces, textured materials and surfaces are commonly used items in these industries. Steel, aluminum, rubber, plastic and glass raw materials, parts and products, featuring mainly these properties, are among the materials where the invention will find the highest degree of application in the commercial vehicles and transportation, two-wheelers, watercrafts industries. The invention also provides the benefits of automobile supply chain efficiency, traceability, user interaction, sustainability, controlling product authenticity of the parts by enabling that data is inserted in and read on all sub-parts and products of vehicles manufactured from these materials.

Passenger and Commercial Vehicle Tire Industry:

The tire industry is one of the most important consumers of natural rubber material obtained from world resources. In tire factories, the raw materials originating from rubber, synthetic rubber, carbon black and many chemicals consist of many components that are assembled together and then cured by pressing under heat and pressure. These components form a serious supply chain for natural and synthetic products from around the world. These components make up the inner lining, body layer, sidewalls, bead rubber, apex (padding), straps, and tread components. Following the mixing and component preparation phases, it is proceeded with the tire making phase, which is the assembly of all components on a tire making drum. When all the components are combined with each other by various methods on the Tire-building machine (TBM), the curing phase is started. At this stage, heat energy is used to apply pressure inside the mold to give the tire its final shape and to trigger the chemical reaction between the rubber and other components. At the last stage, tests such as homogeneity and balance measurement are completed. The supply of all these complex natural and artificial raw materials, the production of components and mixtures create a complex supply chain in the world. This makes tire traceability increasingly important in creating a sustainable economy, ranging from small producers to processors, suppliers, manufacturers, vendors and users to recyclers. For better traceability, companies are trying to place unique and permanent identification marks on each of the tires. The method that is generally tried to be applied is engraving a QR code on the tire by means of Laser Carving machines, and unique identification studies. It is aimed that the codes placed on the tires can be read with readers and smart phones. The QR mark, which is usually engraved on the smoothest and most flat part of the tire, may not maintain the continuity of the symbol when the tires on the vehicle are used for more than one hundred thousand kilometers (millions of miles). While the tires are positioned at park throughout their life, situations such as rubbing against the pavement edges, rubbing the edges of the tires of public transport vehicles and buses approaching the pavement and platform at stop areas, breaking or tearing of tires in various accident damages, road and ground frictions caused by kilometers, scratches, cuts, stretching, as well as dust coating and fragmentation caused by wind, rain, storm and snow are experienced, which may cause deformation of QR symbol, damage and distortion due to deformation, an increase in Axial Non-Uniformity value, and an increase in Distortion Angle. The formation of shape distortions and deformation in the symbol may result in unreadability in readers and mobile devices. The invention provides the transfer of the Unique Cdot Matrix to the entire tire surface using laser marking, thanks to the repeating Unique Cdot Matrix mechanism, and data can be stored on the entire tire surface due to the Unique Cdot Matrix covering the entire tread surface and side walls. Even if the tire, which is affected by environmental factors, experiences friction, tearing, stretching, and fragmentation, a successful reading will be obtained over the smallest 2 mm square area on the tire surface that is in good condition.

Consumer Durables and White Goods

Household appliances; refrigerator (bottom freezer, top freezer, double door, mini refrigerator, no frost refrigerator, wardrobe type refrigerator), dishwashers, washing machines, dryers, washer-dryers, air conditioners, built-in (built-in oven, built-in cooker, extractor hood, hood, built-in sets), freezer (deep freezer, chest type freezer), ovens (mini and midi ovens, stove ovens, microwave ovens), cookers (stovetop cookers, electric cookers), surge protectors, water purifiers and accessories thereof The invention also provides the benefits of supply chain efficiency, traceability, user interaction, sustainability, controlling product authenticity of the parts by enabling that data is inserted in and read on all parts and sub-parts products of mentioned above made from these materials.

Phones

Android phones, iOS phones, smart watch, smart wristband, headphones, desktop phones, phone accessories The invention also provides the benefits of supply chain efficiency, traceability, user interaction, sustainability, controlling product authenticity of the parts by enabling that data is inserted in and read on all parts and sub-parts products of mentioned above made from these materials.

Electronics, Display, Computer Parts, Semiconductors

TV, Display and Sound Electronics: television, projector devices, satellite receivers, media player, home theater and sound systems, soundbar, Bluetooth speaker, headphones, tv accessories, security camera and equipment, tv and audio accessories, phone accessories, game console and accessories, cables, converters and sockets, computer and tablet accessories, professional cameras, mirrorless camera, digital compact camera, HD camera, action camera, photo camera equipment and accessories, drone, treadmill, electric scooter, hoverboard, bicycle, battery and chargers, wearable technology; smart watches, smart bracelets, virtual reality glasses, memory cards, binoculars, telescope, HDMI cables Computers: laptops, desktop computers, tablets, monitors, printers and scanners, computer components (mainboard, ram memory, processor, video card, case), screens, keyboard, mouse set, office supplies (cartridges and toners), memory and storage (hard disk, SSD, USB memory, memory card) computer and tablet accessories, player accessories (keyboard, headset, mouse, mousepad, pc joystick and gamepad)

Semiconductors: The invention provides benefits of supply chain efficiency, traceability, user interaction, sustainability, controlling the authenticity of the part or product by enabling that data is inserted in and read on raw materials, parts or products of the above-mentioned products, including chips that can be found in thousands of products such as computers, smartphones, home appliances, gaming hardware and medical equipment.

The invention also provides the benefits of supply chain efficiency, traceability, user interaction, sustainability, controlling product authenticity of the parts by enabling that data is inserted in and read on all parts and sub-parts products of mentioned above made from these materials.

Kitchen and Home Appliances

Kitchen and Home Appliances: air humidifiers and cleaners, sewing machines and accessories, lighting products, vacuums (bagless vacuum cleaner, dust bag vacuum cleaner, rechargeable vacuum cleaner, vertical vacuum cleaner, robot vacuum cleaner, steam cleaner), irons (steam generator iron, steam iron, ironing board and accessories), smart home and office products (security camera, smart vacuums, smart bulbs, smart heaters and coolers), kitchenware (espresso and cappuccino machine, filter coffee machine, coffee grinders, French press, milk frothers, tea makers, water heaters and kettles), toasters, chopper and rondo, deep fryer, steam cookers, food processor, blender and mixer, juicers, smoothie blender, electric grill and barbecue, kitchen scale, water dispenser, toaster, sandwich toaster, tea makers, ice machines, ice cream machines, waffle maker, mixers and dough mixers, thermos, kitchen supplies and accessories, sinks, garbage compactors, bathroom cabinets, faucets, washbasins, bathroom accessories, sanitary ware, shower systems, water purifiers, shower cabins and hot tubs, toilet bowls and toilet covers, siphons, bathtubs and shower trays, home textiles, wallpapers, wall and ceiling coverings, laundry accessories, knives, sharpeners, scissors, cutting boards, mixing bowls and whisks, strainers and graters, nutcrackers, openers, salad dryers, measuring utensils, cake molds, baking dishes, coffee pot, ladle, spatula, tongs, whisks, core extractor, lemon squeezer, saucepans and steam cookers, egg cookers, pressure cookers, pots, pans, teapots, ovenware, cake and pastry utensils, folding containers, jars, spice racks, thermoses, dishware, trash cans, vacuum machines, vacuum storage containers, vacuum bags, wine stoppers and droppers, carafes and jugs, goblets, cups and mugs, tea set, oil and vinegar bowls, mills, salt shakers and pepper shakers, snack bowls, presentation board, sugar bowl, ice bucket, corkscrew, trivet, wine storage cabinets, cigar cabinets, meat drying cabinets, The invention also provides the benefits of supply chain efficiency, traceability, user interaction, sustainability, controlling product authenticity of the parts by enabling that data is inserted in and read on all parts and sub-parts products of mentioned above made from these materials.

Personal Care and Health Products

Oral care products (electric toothbrush), hair care products (hair straightener, hair dryer, hair styling tools), razors and accessories, hair and beard clippers, epilation tools, laser epilation tools The invention also provides the benefits of supply chain efficiency, traceability, user interaction, sustainability, controlling product authenticity of the parts by enabling that data is inserted in and read on all parts and sub-parts products of mentioned above made from these materials.

Garden Products: garden furniture, garden and balcony awnings and systems, umbrellas and legs, swings, sun loungers, camping equipment, garden machines, irrigation systems, garden hand tools, storage boxes, garden hot tubs, pools, garden lighting products, lawn mower The invention also provides the benefits of supply chain efficiency, traceability, user interaction, sustainability, controlling product authenticity of the parts by enabling that data is inserted in and read on all parts and sub-parts products of mentioned above made from these materials.

Heating and Cooling Products: electric fireplaces, construction site heaters, infrared heaters, quartz heaters, fan heaters, flueless fireplaces, desktop fireplaces, fireplace accessories, oil radiators, water heaters and water heaters, air conditioners, fans, combi boilers, stoves The invention also provides the benefits of supply chain efficiency, traceability, user interaction, sustainability, controlling product authenticity of the parts by enabling that data is inserted in and read on all parts and sub-parts products of mentioned above made from these materials.

Hardware: shelves and cabinets, hardware products, door and window accessories, locks, ladders, furniture handles and legs, wall shelf systems The invention also provides the benefits of supply chain efficiency, traceability, user interaction, sustainability, controlling product authenticity of the parts by enabling that data is inserted in and read on all parts and sub-parts products of mentioned above made from these materials.

Machinery and Hand Tools: drills and cordless screwdrivers, grinders, compressors, generators, welding machines, planers and routers, grinders, stone engines and accessories, spray guns and mixers, laser measuring devices, pressure washers and apparatus, saws and accessories, home and hobby machines, construction machinery, machine bits, hand tools, staple guns, silicone guns, mechanical meat tools, welding machines The invention also provides the benefits of supply chain efficiency, traceability, user interaction, sustainability, controlling product authenticity of the parts by enabling that data is inserted in and read on all parts and sub-parts products of mentioned above made from these materials.

Furniture and Decoration: modular and ready-made wardrobes, dining tables, chairs and stools, desks and chairs, caissons and cabinets, workspace accessories, bookcases and shelves, cupboards, dimensional shelves and doors, coat racks, open shelving systems, wall shelves, shoe cabinets, tv units, tv stands, tv cabinet systems, office furniture, children's table and chair, separators, armchairs, sofas, coffee tables, showcase and consoles, sideboards, bedsteads and divans, nightstands and dressers, beds and mattress pads, bedding, window textiles, bathroom textiles, cushions, fabrics, table and decoration items (dinnerware, serving plates and bowls, glasses and goblets, cutlery, glass, crystal, silver, ceramic, porcelain table and decoration items, serving trolleys), mirrors, frames, vases, clocks, boards, tables The invention also provides the benefits of supply chain efficiency, traceability, user interaction, sustainability, controlling product authenticity of the parts by enabling that data is inserted in and read on all parts and sub-parts products of mentioned above made from these materials.

Lighting and Electro: bulbs, chandeliers, floor lamps, spots, lampshades, table lamps, floor lamps, ceiling lamps, sconces and plafonds, lanterns and searchlights, fuses and boxes, satellite receiver antenna and accessories, led lighting, outdoor lighting, switch and socket series, battery powered and rechargeable lights, batteries and chargers, electrical installation materials, modems, power supplies and measuring devices, insect fly and mouse repellents The invention also provides the benefits of supply chain efficiency, traceability, user interaction, sustainability, controlling product authenticity of the parts by enabling that data is inserted in and read on all parts and sub-parts products of mentioned above made from these materials.

Construction Industry and Building Materials

Woods, solid panels, wiped timbers, parquet and accessories, steel doors, wooden doors, door handles, ceramics, construction materials, insulation materials, roofing materials, interior and exterior paints, natural stories, bricks and tiles, installation repair materials, extensions, regulators, valves, nipples, waste water pipe accessories, clean water pipe accessories, clean water pipes, waste water pipes, pprc pipes, combi connection pipes, electric cranes, transport trolleys and pallet trucks, hoists, forklifts, Safety Equipment: fingerprint, electronic password, motorized money and document storage safes, fire extinguishing equipment, smart home and office systems (smart socket, smart relay, indoor and outdoor video camera, video camera, video recorders, sound recorders, key control, keypad, keypad control, remote control, gas sensor, smoke detector, flood sensor, vibration sensor, room sensor, motion sensor, window sensor, smart socket, panic button, siren and alarm systems), helmets, safety products, glasses, work safety shoes, work clothes, knee pads, Sport: hunting products and accessories, fishing products and accessories, equestrian products and accessories, bicycles and accessories, diving equipment and accessories, fitness cardio products and accessories, camping products and accessories, canoe, sup and accessories, surf and kitesurf products and accessories, archery, target sports equipment and accessories, skate, skateboard, scooter equipment and accessories, climbing and mountaineering equipment and accessories, gym equipment and accessories, golf equipment and clubs, sailing equipment and accessories, poles, ski and snowboard equipment, rackets, bicycles, helmets, binoculars, magnifying glasses, flippers, football goals, basketball hoops, sports and sports textile products, shoes and accessories The invention also provides the benefits of supply chain efficiency, traceability, user interaction, sustainability, controlling product authenticity of the parts by enabling that data is inserted in and read on all parts and sub-parts products of mentioned above made from these materials.

Aviation, Space and Aerospace Products

Aviation industry products have a wide range of products: flight vehicles are very diverse, and there are millions of different parts in them. General aviation aircrafts: light aircrafts, helicopters, air taxis, agricultural sprayers, acrobatic aircraft, gliders, motor gliders, air ambulances, fire control aircraft, private aircraft with other civil applications used for commercial, corporate and personal transportation, as well as commercial transportation, cargo planes and military planes in the heavier aircraft category. In addition, the entire aviation and space industry, including unmanned aerial vehicles, missiles, space launchers, spacecraft, and airships, consists of a large number of onboard subsystems required by the designs of their vehicles. Including reciprocating engines, turbine engines and rocket engines, mechanical and cable systems, doors, control surfaces, take-off and landing gear systems, propellers, reverse thrust devices, fuel tanks, auxiliary engines, solar panels, batteries and fuel cells, all instruments in the vehicles, sensors and electronic equipment and the electrical systems that connect them to each other, and the metal and plastic enclosures of these systems. The invention provides the benefits of supply chain efficiency, traceability, user interaction, sustainability, control of part or product authenticity by enabling that data is inserted in and read on the raw materials, parts or products of the above-mentioned products. In addition, materials research and development studies, diversification of aluminum and lithium and other alloys, developments in high temperature polymer matrix composites, light alloys and metal matrix composites as well as light metals are always carried out in order to reduce the weight of aircraft in the industry. Product developments and testing also involves a multitude of processes and applications, many of which depend on complex equipment and facilities.

The invention also provides the benefits of supply chain efficiency, traceability, user interaction, sustainability, controlling product authenticity of the parts by enabling that data is inserted in and read on all parts and sub-parts products of mentioned above made from these materials.

Textile and Apparel Industry

The clothing industry, apparel industry, textile industry (cotton, wool, fur and synthetic fiber producers), yarn and fabric manufacturers, fashion industry, apparel and apparel retailing can use the invention for their needs such as traceability, textile recycling and sustainability throughout the entire production and value chain, checking the authenticity of textile products, and customer interaction. Fashion brands and clothing companies bear a great deal of cost in terms of digitally identifying the accessories such as handbags, clothes, shoes, jewelry and watches, wallets, suitcases, etc. sold all over the world, to match the product with the customer in the store and create the records, and prove the authenticity of the product to the customer. The invention can also be used in the field of identification of ready-made clothing products of different material types.

Jewelry and Watches

Today, both the jewelry and watch industries are one of the sectors where data processing is most difficult in terms of raw materials used, properties of metals and alloys, processes and additional processes, multi-part, small size of the parts, and the shaped form of the parts. On the one hand, the position of alloys produced from precious metals in the supply chain is gaining importance day by day. The production source of precious metals, the place where they are processed, the mixtures that make up their content are among the information whose records are kept by the producers together with the products. However, nowadays, as the consumers tend to make more conscious choices, sustainability has started to play an important role in the purchasing decision of this sector. Manufacturers seek to create greater traceability and transparency in their companies' supply chain to demonstrate consumers that they are trustworthy and sincere in driving environmental and social progress. This causes them to try to make the whole process of the mines used in the products more visible to the consumers, including where they are mined in the world, and by whom, as well as the mixture and quality values of the mine. In other words, purchasing of quality jewelry as influenced by considerations of sustainability has led to the need to store more data on the products and make this data viewable by consumers. On the other hand, it is now demanded by the consumers that the authenticity of the products can be verified by the consumers. However, the fact that the parts used, processed and assembled in the sector are small and shaped is one of the most important obstacles to data processing. For this reason, the industry may still present product information to consumers using printed certificates. The invention makes it possible to process data and read data even in cases where the parts used, processed and assembled in the products are small and shaped by means of laser carving and UV printing methods on surfaces.

The solutions of the invention vary in terms of raw material, part and product structure, production processes and stages and in line with the needs of the sector, but it also finds use in Energy Technologies, Solar Energy and Photovoltaic, Mechanical and System Engineering, Construction sector, Dental and Medical Technologies and Science.

Benefits and Efficiency of the Invention and Improvements to the Technology:

While 2D image processing devices, especially known industrial codes, namely solutions such as Datamatrix, QR code, are transferred to the over the raw materials, components and materials and elements with Laser carving devices, High watt producing Laser carving device types were preferred especially because of production cycle time problems and to create clear traces on the products.

Thanks to our invention, it is possible to perform unique object or material identification and classification on the over the raw materials, components and materials and elements with a laser carving device with minimum specs, and the Cdot matrix provides a cost advantage in particular by enabling businesses to prefer the minimum spec models of these complex machines, which are obliged to purchase especially in their dense cells.

2D image processing devices need high resolution lenses and enterprise equipment to minimize the problems of reading known industrial codes, namely Datamatrix, QR code solutions.

In the simplest terms, laser carving is a permanent process that uses a concentrated beam of light to create a permanent mark on a surface. Typically performed with a fiber, pulsed, continuous wave, green or UV laser machine, laser carving covers a wide variety of applications.

These machines are special devices designed to leave a permanent mark starting with 20 watt energy production up to 100 watt production. They have become the most preferred machines in the industry to leave a permanent mark on the over the raw materials, components and materials and elements for traceability.

In our invention, 20 Watt machines, which are the most standard version of laser carving machines, ensure the cycle time and permanent identification on the over the raw materials, components and materials and elements. Thus, reducing the machine investments that businesses will need by 75%.

With our invention, the Unique Cdot Matrix can be read and analyzed at the level of the smallest webcams, together with minimum camera lenses with a resolution of 1280× 1024 pixels.

In this way, businesses can reduce the cost of all the equipment they need to solve the light and contrast problems required for high-cost industrial camera installations and healthy readings to Interpreting Datamatrix encodings. Because, thanks to our invention, which is described in detail, it provides 100% authentication in low-light environments and low-resolution readings.

Because, thanks to our invention, which is explained in detail, it provides one hundred percent authentication in low-light environments and low-resolution readings. Distributed I/O modules have been used in industrial automation and control systems in recent years. Likewise, the use of distributed I/O modules in 'process automation' applications has shown a rapid rise. Especially in 'process automation' applications, devices and sensors in the facility are distributed over a wider area.

In our invention, instead of high-tech model preferences in equipment such as readers, laser carving devices, sensors, wiring and lighting that businesses need to install; It is expected that all these products will provide a 75% profitability in the investment costs required for traceability in the factories to be equipped with standard model readers, laser carving machines, cabling and lighting.

Making the electrical connections of the signals from these regions to the I/O modules on the PLC causes both serious labor and high costs. However, thanks to our invention, which allows standard equipment selections and control systems to work, by making permanent identification 100% readable, electrical cable connections of devices and sensors are minimized, thus minimizing time and cable costs.

Although our present invention is an application that is used in many areas in businesses, the following issues come to the fore as the main goals and/or advantages.

One of its most important applications is to see the current goods inventories and production measurements at any time;

Correct entry and creation of production and stocking information within the production and storage area;

After all the processes that the product will experience, the information about the product is lost or the information can be read even if it becomes unreadable. Preventing events such as surprise and misinformation in military applications;

It is the prevention of loading and shipping errors.

There are also disadvantages of high resolution readers and light systems installed in order to be able to read systems such as Datamatrix and QR in a healthy way. If it is necessary to bet on them:

High costs: Important cost items are the cost of light systems, high-resolution lenses, software, integration and maintenance services. The most important cost among these items is the special reader device costs.

Standardization Problems: Even if solutions such as Datamatrix and Qr are applied on the product in industrial conditions, they cannot provide a stable face-to-face product identification due to problems such as the face-to-face readability of the systems or the external conditions to which they will be exposed, the product surface variability after additional processes ( . . . Processes).

The main benefits of the invention to the production industry:

Quality Increase in Production: Thanks to our invention, it helps to prevent key mistakes in production and increase production quality with the quality control points included in the production process.

Reduction in Rework Rates and Production Cost: As a result of the controls made during production, production errors are detected at the beginning stage and resolved in a short time. Thus, there will be a decrease in rework workmanship as well as a decrease in production costs indirectly.

Helps You Perform Root Cause Analyzes: Our invention provides access to data at every stage of the manufacturing process, allowing the root causes of problems to be found. These problems can be quickly identified and resolved.

Clarifies Inter-Operational Cost Analysis: Because our invention monitors how the production process moves, the cost and value stream in the process can be clearly observed.

Helps Continuous Improvement: Seeing how parts and products move between lines facilitates continuous improvement. Knowing where and when bottlenecks or delays occur enables real-time optimization

What is claimed is:

1. A method for traceability of raw materials or objects exposed to operational conditions in industry, the method comprising:
 a code phase comprising:
  uploading a design file to a Cdot application programming interface (API);
  classification of a coordinate area size of the design file to provide a design matrix;
  coding parameter inputs of the design matrix;
  generating a Cdot matrix by embedding a unique codeword into the design matrix using a Cdot matrix calculation algorithm to calculate a location of dots within the design matrix, wherein the unique codeword corresponds to a unique object or material identification;
  mapping bit color of the Cdot matrix;
  providing a display buffer in a reader device that captures at least 20 imagers per every one second;
 a decoding phase comprising:
  reading the unique Cdot matrix image with a reader device and storing digital images of the unique Cdot matrix image in the display buffer of the reader device;
  creating a Cdot matrix image from a raw image of a material or object or product having a Cdot matrix on a surface captured by a camera of the reader device;

partitioning or dividing different layers of the Cdot matrix image into color cells;

detection of a progressive code locator and determination of a location of the progressive code locator in the Cdot matrix image;

decoding coded values in a code area of the Cdot matrix image to extract an assertive code;

detecting and correcting errors in the assertive code;

interpreting the assertive code to determine a unique object or material identification definition;

synchronizing the unique object or material identification definition with a tracking ID value in a core system;

providing the object or material identification definition to the reader device and displaying the identification definition on a display of the reader device.

2. The method for traceability of raw materials or objects exposed to operational conditions in industry of claim 1, wherein the step of generating the Cdot matrix comprises placing an alignment symbol to a top left section of the Cdot matrix, calculating Reed-Solomon Error Correction bits, selecting a mask, and placing mask information around the alignment symbol.

3. The method for traceability of raw materials or objects exposed to operational conditions in industry of claim 1, wherein the step of mapping bit color of the Cdot matrix comprises mapping shape, size, color, shadow, and relationships of the design matrix.

4. The method for traceability of raw materials or objects exposed to operational conditions in industry of claim 1, wherein the step of creating the Cdot matrix image from the raw image comprises filtering, graying, thresholding, and morphological preprocessing.

5. The method for traceability of raw materials or objects exposed to operational conditions in industry of claim 1, wherein the step of detection of the progressive code locator and determination of location comprises steps of at least one of frame synchronization, corner tracer detection, correcting perspective distortion, correcting motion and focus blur, color manipulation, and reducing noise from vibration and shaking of the camera of the reader device.

6. The method for traceability of raw materials or objects exposed to operational conditions in industry of claim 1, wherein the step of decoding coded values in a code area of the Cdot matrix image to extract the assertive code comprises generating code locators in middle and right columns and columnizing dots.

7. The method for traceability of raw materials or objects exposed to operational conditions in industry of claim 1, wherein the step of detecting and correcting errors in the assertive code comprises forward error detection including steps of syndrome calculation, Berlekamp Massey Algorithm for finding the error-locator polynomial, Chien Search Algorithm for finding the roots of the error-locator polynomial, and Forney algorithm calculation of error size.

8. The method for traceability of raw materials or objects exposed to operational conditions in industry of claim 1, wherein the step of interpreting the assertive code to determine a unique object or material identification definition comprises synchronizing the assertive code with a Hex value and recording the assertive code in a database.

9. The method for traceability of raw materials or objects exposed to operational conditions in industry of claim 1, wherein the step of synchronizing the unique object or material identification definition with a tracking ID value in a core system comprises associating the tracking ID with a counterpart in the database.

10. The method for traceability of raw materials or objects exposed to operational conditions in industry of claim 1, wherein the Cdot matrix is provided on the surface of a raw material or object without disturbing the raw material or object quality or structure.

11. The method for traceability of raw materials or objects exposed to operational conditions in industry of claim 1, wherein the Cdot matrix calculation algorithm comprises a coding with a specially developed mathematical algorithm using a gaussian mixture model.

12. A system for providing traceability to raw materials or objects exposed to operational conditions in industry, the system comprising:

a coding module in a software application program interface (API), the coding module comprising:

a design entry module configured to receive a unique Cdot matrix file via a communication channel, a coordinate area size and material classification module configured to identify and classify the unique Cdot matrix file, a coding parameter input module configured to populate an information database using cell bits obtained by design preprocessing, material classification and feature extraction and data calculated as pixels of the unique Cdot matrix file, a Cdot matrix generation module configured to embed a codeword into the Cdot matrix generating a unique Cdot matrix, and a bit color mapping and formation module configured to map attributes of the unique Cdot matrix, wherein the coding module provides the unique Cdot matrix to a printing device; and a printing device comprising:

a memory configured to receive the unique Cdot matrix from the coding module, and a printing module to print the unique Cdot matrix on a raw material or object exposed to operational conditions in industry.

13. The system for providing traceability of raw materials or objects exposed to operational conditions in industry of of claim 12, wherein the Cdot matrix generation module is configured to embed the codeword into the Cdot matrix using a Cot matrix calculation algorithm that comprises calculating Reed-Solomon Error Correction bits, selecting a mask, and placing mask information around an alignment symbol.

14. The system for providing traceability of raw materials or objects exposed to operational conditions in industry of claim 12, wherein the bit color mapping and formation module is configured to map attributes including shape, size, color, shadow, and relationships.

15. A system for reading and decoding a Cdot matrix applied to raw materials or objects exposed to operational conditions in industry, the system comprising:

a reading device having a camera, a camera buffer, and a display, whererin the camera is configured to a capture an image of a raw material or object having a Cdot matrix applied and storing the image in the camera buffer; and a decoding module, the decoding module comprising:

an image preprocessing module configured to reduce noise and remove unnecessary details of the captured image to generate a Cdot matrix image, a partitioning or dividing module configured to partion or divide different layers of the Cdot matrix image into color cells, a code locator module configured to determine a location of a progressive code locator in the Cdot matrix image, a decoding module configured to decode coded values in a code area of the Cdot matrix to extract an assertive code, an assertive code interpreting module configured to determine a unique object or material identification definition, and a sychronization module configured to associate the unique object or material identification definition with a tracking ID value in a core system, wherein the decoding module provides the object or material identification definition to the reader device and the reader device displays the identification definition on the display of the reader device.

16. The system for reading and decoding a Cdot matrix applied to raw materials or objects exposed to operational conditions in industry of claim 15, wherein the image preprocessor module is configured to create the Cdot matrix image from the raw image by applying filtering, graying, thresholding, and morphological preprocessing to the raw image.

17. The system for reading and decoding a Cdot matrix applied to raw materials or objects exposed to operational conditions in industry of claim 15, wherein the code locator module is configured to perform at least one of frame synchronization, corner tracer detection, correcting perspective distortion, correcting motion and focus blur, color manipulation, and reducing noise from vibration and shaking of the camera of the reader device.

18. The system for reading and decoding a Cdot matrix applied to raw materials or objects exposed to operational conditions in industry of claim 15, wherein the decoding module is configured to generating code locators in middle and right columns of the Cdot matrix and columnizing dots when extracting the assertive code.

* * * * *